US008489701B2

(12) United States Patent  
Manion et al.

(10) Patent No.: US 8,489,701 B2
(45) Date of Patent: Jul. 16, 2013

(54) PRIVATE VIRTUAL LAN SPANNING A PUBLIC NETWORK FOR CONNECTION OF ARBITRARY HOSTS

(75) Inventors: Todd Manion, Bellevue, WA (US); Arsalan Ahmad, Aachen (DE); Alain Gefflaut, Herzogenrath (DE); Sandeep Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1393 days.

(21) Appl. No.: 11/769,941

(22) Filed: Jun. 28, 2007

(65) Prior Publication Data

US 2008/0183853 A1 Jul. 31, 2008

Related U.S. Application Data

(60) Provisional application No. 60/898,519, filed on Jan. 30, 2007.

(51) Int. Cl.
*G06F 15/16* (2006.01)
*G06F 15/173* (2006.01)

(52) U.S. Cl.
USPC ............................ 709/217; 709/223; 709/227

(58) Field of Classification Search
USPC ........................................ 709/217, 223, 227
See application file for complete search history.

(56) References Cited

U.S. PATENT DOCUMENTS

| 6,016,318 A | 1/2000 | Tomoike |
| 6,977,900 B2 | 12/2005 | Wiedeman et al. |
| 7,206,841 B2 | 4/2007 | Traversat et al. |
| 7,206,934 B2 | 4/2007 | Pabla et al. |
| 2003/0204742 A1* | 10/2003 | Gupta et al. .................. 713/200 |
| 2003/0214955 A1 | 11/2003 | Kim |
| 2004/0006708 A1 | 1/2004 | Mukherjee et al. |
| 2004/0153858 A1 | 8/2004 | Hwang |
| 2005/0004916 A1* | 1/2005 | Miller et al. ..................... 707/10 |
| 2005/0091529 A1* | 4/2005 | Manion et al. ................. 713/201 |
| 2005/0251577 A1* | 11/2005 | Guo et al. ....................... 709/230 |
| 2005/0267993 A1* | 12/2005 | Huitema et al. ............... 709/245 |
| 2006/0005013 A1* | 1/2006 | Huitema et al. ............... 713/162 |

(Continued)

FOREIGN PATENT DOCUMENTS

CN 1601996 A 3/2005

OTHER PUBLICATIONS

Ganguly et al "IP over P2P: Enabling Self-configuring Virtual IP Networks for Grid Computing", Apr. 2006, pp. 1-10.*

(Continued)

*Primary Examiner* — Karen Tang

(57) ABSTRACT

Architecture for exposing a virtual private network of peer devices into the public domain via an overlay network. Computing devices, peripheral devices, as well as mobile devices can be physically distributed, but appear to belong to the same virtual private (or home) network, and be accessible from anywhere. Benefits include access to user media/documents from anywhere, searching of all connected devices from one location, multicast and broadcast connectivity, management of the private network and the associated policies, and device discovery on the private network from across public networks. P2P networks and ad-hoc networks can be exposed as a virtual interface, as well as the utilization of client operating systems to create the virtual network, grouping, graphing, the integration with relay services and other NAT/firewall traversal schemes, and the creation of a P2P overlay manager on a physical NIC (network interface card) address rather than a virtual address.

20 Claims, 19 Drawing Sheets

U.S. PATENT DOCUMENTS

| | | | |
|---|---|---|---|
| 2006/0167985 | A1 | 7/2006 | Albanese et al. |
| 2006/0215684 | A1 | 9/2006 | Capone |
| 2007/0071012 | A1 | 3/2007 | Park et al. |
| 2008/0151778 | A1* | 6/2008 | Venkitaraman et al. ...... 370/254 |
| 2010/0121943 | A1* | 5/2010 | Hoover et al. ................ 709/219 |

OTHER PUBLICATIONS

Agrawal et al "Towards P2P—routed IP Overlay Networks for Grid Virtual Machines", Jul. 2005, pp. 293-294.*
L. Zhou and R. Van Renesse. P6P: A Peer-to-Peer approach to internet infrastructure, p. 1-6, 2004.*
International Search Report, mailed May 13, 2008, 10 pages.
Matthew Perry, et al., "Peer-to-Peer Discovery of Semantic Associations", 2nd International Workshop on Peer-to-Peer Knowledge Management, Jul. 17, 2005, 21 pages, San Diego, CA.
Dmitri Loguinov, et al., "Graph-Theoretic Analysis of Structured Peer-to-Peer Systems: Routing Distances and Fault Resilience", Applications, Technologies, Architectures, and Protocols for Computer Communication, Proceedings of the 2003 conference on Applications, Technologies, Architectures, and Protocols for Computer Communications 2003, pp. 395-406, Karlsruhe, Germany.
Uyless D. Black, "IP Protocol Routing: RIP, OSPF, BGP, PNNI, and CISCO Routing Protocols", 2000, 287 pages, Prentice Hall PTR, Upper Saddle River, NJ, USA, ISBN: 0130142484.
John T. Moy, "OSPF: Anatomy of an Internet Routing Protocol", Feb. 12, 1998, 339 pages, Addison-Wesley Professional, ISBN: 0201634724.
"VPN-1 Power VSX", Check Point Software Technologies Ltd, pp. 1-4.
Sayeed et al., "Technology Overview: Making the Technology Case for MPLS and Technology Details", retrieved at <<http://www.ciscpress.com/articles/article.asp?p=680839&seqNum=6&rl=1>>, Jan. 12, 2007, Cisco Press, pp. 1-4.
Lua et al., "A Survey and Comparison of Peer-to-Peer Overlay Network Schemes", retrieved at <<http://www.cl.cam.ac.uk/teaching/2005/AdvSysTop/survey.pdf>>, IEE Communications Survey and Tutorial, Mar. 2004, pp. 1-22.
Ahmad et al., "P2P-VPN: A Peer-to-Peer Based Virtual Private Network", European Microsoft Innovation Center, pp. 1-9.
Ahmad, "Design and Implementation of a P2P based Virtual Private Network", Dec. 26, 2007, Department of Wireless Networks RWTH, Aachen University, pp. 1-119.
Karagiannis et al., "Is P2P Dying or Just Hiding", ACM Technews 6(712), Oct. 2004.
Perkins et al., "Ad hoc On-Demand Distance Vector Routing", Proceedings of the 2nd IEEE Workshop on Mobile Computing Systems and Applications, Feb. 1999.
Agrawal et al., "Towards P2P Routed IP Overlay Networks for Grid Virtual Machines", Proceedings of the 14th IEEE International Symposium on High Performance Distributed Computing (HPDC), Jul. 2005.
Aoyagi et al., "ELA: A Fully Distributed VPN System over Peer-to-Peer Network", Proceedings of the 2005 Symposium on Applications and the Internet (SAINT'05), Jan. 2005.
Microsoft Corporation, "Installing Remote Desktop Web Connection in Windows XP", available at http://www.microsoft.com/windowsxp/using/mobility/getstarted/remoteintro.mspx, May 2004.
Applied Networking Inc., "hamachi—secure mediated peer to peer", available at http://www.hamachi.cc, Jan. 2006.
Dykstra, "ttcp/nttcp/nuttcp/iperf versions", available at http://sd.wareonearth.com/~phil/net/ttcp/, Mar. 2004.
Titz, "Why TCP Over TCP Is a Bad Idea", available at http://sites.inka.de/sites/bigred/devel/tcp-tcp.html, Apr. 2001.
Microsoft Corporation, "Introduction to Windows Peer-to-Peer Networking", available at http://www.microsoft.com/technet/prodtechnol/winxppro/deploy/p2pintro.mspx, Published Jan. 2003, Updated Sep. 2006.
Microsoft Corporation, "Peer Name Resolution Protocol", available at http://www.microsoft.com/technet/network/p2p/pnrp.mspx, Sep. 2006.
Huitema, "Teredo: Tunneling IPv6 over UDP through Network Address Translations (NATs)", RFC 4380, Internet Engineering Task Force (IETF), Mar. 2004.
Microsoft Corporation, "Virtual Private Networking: An Overview", available at http://technet.microsoft.com/en-us/library/bb742566.aspx, Sep. 2001.
Office Action from the State Intellectual Property Office of the People's Republic of China regarding Application No. 200880003200.5 dated Jan. 14, 2013.
Office Action from the State Intellectual Property Office of the People's Republic of China regarding Application No. 200880003200.5 dated Jun. 27, 2012.
Office Action from the State Intellectual Property Office of the People's Republic of China regarding Application No. 200880003200.5 dated May 10, 2013.

* cited by examiner

PRIVATE VIRTUAL LAN SPANNING A PUBLIC NETWORK FOR CONNECTION OF ARBITRARY HOSTS

CROSS-REFERENCE TO RELATED APPLICATIONS

This application claims the benefit of U.S. Provisional Patent application Ser. No. 60/898,519 entitled "PRIVATE VIRTUAL LAN SPANNING A PUBLIC NETWORK FOR CONNECTION OF ARBITRARY HOSTS" and filed Jan. 30, 2007, the entirety of which is incorporated by reference herein.

BACKGROUND

Today, the concept of a "home" and some "small business" networks are limited to the physical network on which the PCs are connected. Peer-to-peer (P2P) systems have gained widespread popularity and emerged as one of the major sources of the Internet traffic. P2P networks enable client machines to communicate directly with each other, without the need for a hosted infrastructure or dedicated servers. P2P networking offers several advantages, related at least in part to easy setup, efficient data transfer, and network resilience. While initially conceived and popularized for the purpose of file sharing, P2P has now emerged as a general paradigm for the construction of resilient, large-scale, distributed services and applications in the Internet.

Conventionally, some operating systems provide network solutions that enable hosts to join a private named P2P "overlay" network. Nodes can identify the overlay networks by name, and automatically locate other active participants within the overlay. Within these overlay networks, active nodes can create and self-organize communication paths, enabling resilient communication and low-latency data transfer. For example, overlay networks can provide a variety of services, including messaging and database replication, for communication among active nodes.

Unfortunately, the conventional P2P overlay network concepts have several limitations. The network is only available to applications that specifically program to the overlay network APIs (meaning that the overlay cannot be used for general network communication). Additionally, it is difficult for multiple applications to share the same overlay network, and users have no direct standard way of configuring and managing overlay networks.

Seamless virtual networking is a well-established concept of which two examples in common use include virtual private networks (VPNs) and virtual local area networks (VLANs). Users configure and launch VPNs (whether over IPSec, PPTP, L2TP/IPSec, etc.) that establish a point-to-point (client-server) connection over a public network (e.g., the Internet) or some other physical media. The VPN is exposed as a virtual network interface that effectively hides the point-to-point "overlay" connection, and rather, exposes seamless IP routability between the VPN client, VPN server, and networks exposed by the VPN server. VLANs illustrate another example of seamless virtual networking. In a VLAN, network switches aggregate a collection of physical links into a logical subnet by specially tagging (e.g., IEEE 802.1q) Ethernet frames. Hosts on a VLAN form a single broadcast domain where network switches take responsibility for forwarding packets as needed to create the virtual subnet semantics for the client hosts. However, these and other conventional networks fail, in part, to provide efficient and seamless connectivity between peer nodes on private and public networks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a server-less peer-to-peer virtual private network, referred to hereinafter as an Internet virtual LAN (IVLAN), based on the overlay network technology. The IVLAN enables the creation of a virtual IP network having the properties of a standard local area network without requiring a central server. This technology enables applications normally running only in a single physical network to actually be used in a completely distributed way over networks such as the Internet. In situations where no network infrastructure exists, the system can also enable IP applications to operate on devices communicating through multi-hop ad hoc communication links (e.g., Wi-Fi, Bluetooth, etc.).

In one embodiment, the architecture is described in the context of an existing Windows™ P2P SDK (software development kit) that enables the formation of a network graph or overlay network. To enable the IVLAN scenario, a Windows™ P2P SDK graphing component can be extended with a routing protocol that allows messages to be routed to any node participating in the overlay network. On top of the overlay, a virtual IP layer based on a TAP (or virtual network interface) is built to provide the illusion of a local area network.

The virtual network has all the characteristics of a standard local area network and supports IPv4 and IPv6 unicast, multicast, and broadcast packets. Accordingly, the architecture allows applications normally restricted to a local area network to be run over the Internet without any modification.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
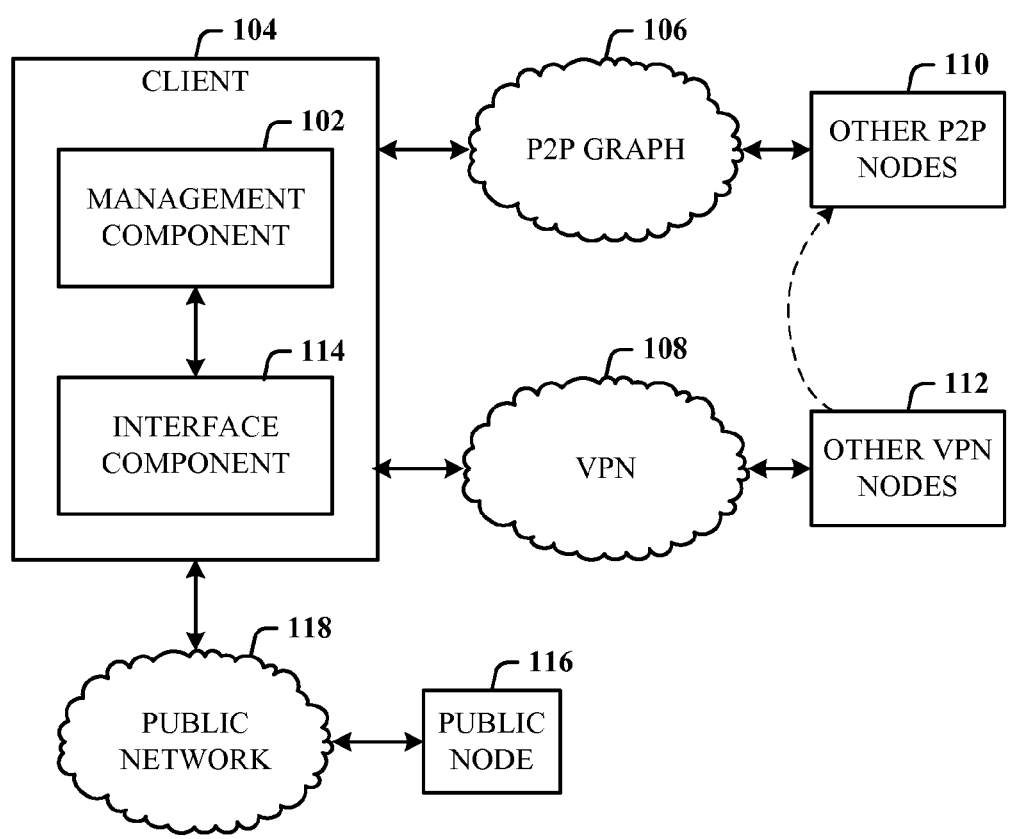
FIG. 1 illustrates a computer-implemented networking system for extending private network access into the public domain.

The disclosed architecture combines the technologies of peer-to-peer (P2P) overlay networks, virtual private networks (VPNs), and virtual local area networks (VLANs) to form a novel entity that will be referred to throughout the description as an Internet virtual LAN (IVLAN). Although the term "Internet" is used, it is to be understood that the disclosed architecture is not limited to the Internet, but can also be applied to any public network. IVLANs are private virtual networks comprised of arbitrary hosts connected over the Internet. Within an IVLAN, a group of nodes form an overlay network. However, this overlay network can have one or more of the following three properties. Similar to a VPN, the overlay network supports IP routing. Thus, packets sent to other members (or nodes) of the overlay network are routed (hop-by-hop) through the overlay itself. However, in general, the overlay network supports some form of routing, and is not limited to only IP routing. Similar to both VLANs and VPNs, the IVLAN is exposed as a network interface that applications can access using standard Winsock calls (for purposes of this discussion, each host is assigned a private IPv4 and/or IPv6 address within the context of the overlay network). Similar to a VLAN, the IVLAN supports broadcast/multicast semantics. In other words, the private addresses (e.g., IPv6) assigned inside the overlay share a common network address prefix. When a subnet broadcast is transmitted on the IVLAN, the packet is forwarded to all hosts participating in the underlying overlay.

Membership in the IVLAN can be authenticated on a per-connection basis, thus, the IVLANs are private. However, it is not necessary for each host to a priori know the identity of every other host. Instead, it is sufficient for each host to simply validate that its peers are authorized (and hence, trusted) members of the IVLAN. By way of analogy, IVLANs bring to the Internet the semantic equivalent of "direct connect" or multi-connect or routing connect found in cellular networks.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented networking system 100 for extending private network access into the public domain. The system 100 includes a management component 102 of a client 104 for creating and managing a peer-to-peer (P2P) graph 106 that overlays a virtual network 108 (e.g., a virtual private network (VPN)) for P2P communications between the client 104 and other arbitrary nodes 110. In other words, the client 104 can create the graph 106 to which other VPN nodes 112 can join as peer devices.

The client 104 can also include an interface component 114 for exposing the arbitrary P2P nodes 110 of the P2P graph 106 to a public node 116 disposed on a public network 118.

The other VPN nodes 112 can also include the management component 102 and interface component 114 in support of joining the P2P graph 106 as part of the other P2P nodes 110 and communicating according to a peer technology, not only among the other P2P nodes and the client 104, but also to the public node 116.

The interface component 114 exposes the P2P graph 106 to the public node 116 as a virtual interface. The management component 102 is created on a physical interface IP address, wherein the IP address is an IPv4 and/or an IPv6 address. As will be described herein, the interface component 114 includes a virtual network interface card (VNIC) controlled by a VNIC driver, where the VNIC driver exposes a miniport driver and a file stream interface for passing IP packets between a VNIC and the management component 102 for routing and transmission to the arbitrary nodes of the P2P graph 106. The management component 102 includes a routing protocol for enabling multi-hop message routing over the P2P graph 106. The management component 102 includes a user-level application for controlling and configuring the VNIC driver, and communicating IP packets on behalf of the VNIC. Other aspects of the management component 102 facilitate at least one of multicast traffic or broadcast traffic and traversal of at least one of a firewall system or a network address translation system.

Figure 2:
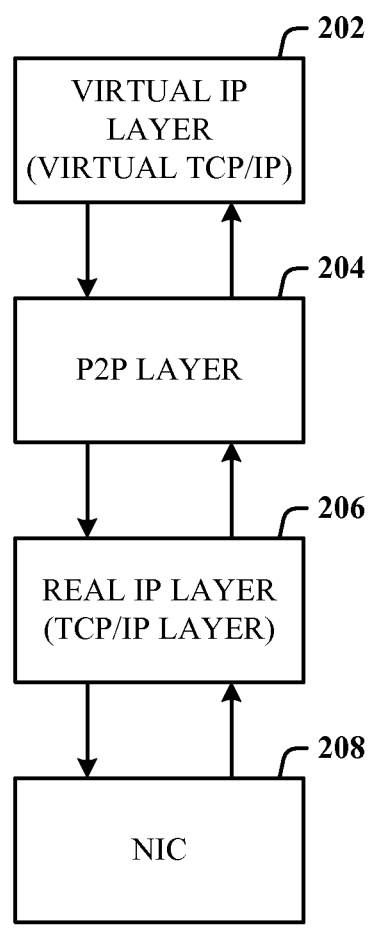
FIG. 2 illustrates a logical architecture of the disclosed IVLAN capability.

FIG. 2 illustrates the logical architecture 200 of the disclosed IVLAN capability. The architecture 200 includes a virtual IP layer 202 for handling virtual TCP/IP, over a P2P layer 204 for processing P2P traffic. The virtual layer 202 and P2P layer 204 are provided over the real IP layer 206 and a physical interface 208 (e.g., a NIC).

Figure 3:
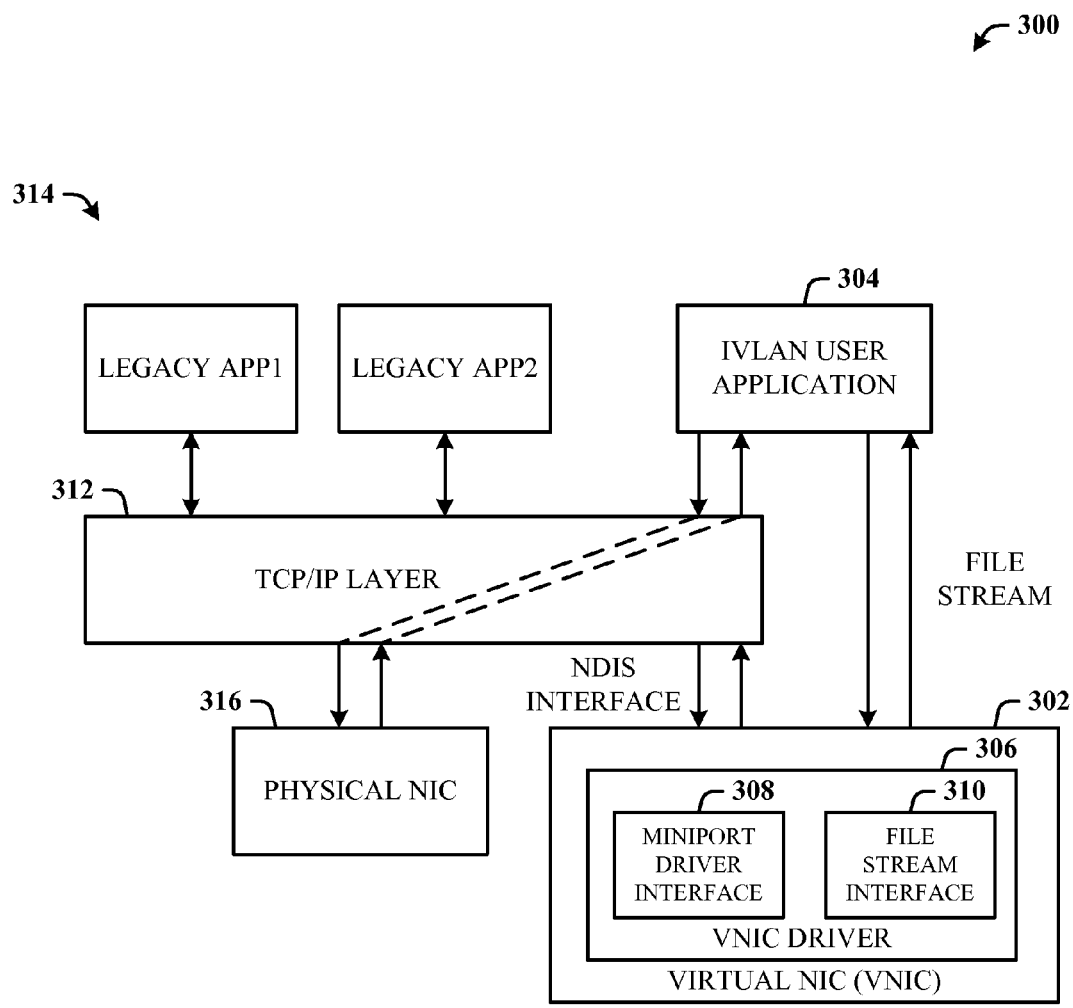
FIG. 3 illustrates a more detailed diagram of the IVLAN architecture for a client.

FIG. 3 illustrates a more detailed diagram of the IVLAN architecture 300 for a client. The architecture 300 includes a VNIC 302 and a user-level IVLAN application 304. The VNIC 302 includes a VNIC driver 306 (also referred to as the IVLAN driver) that exposes a standard NDIS (network drive interface specification, e.g., version 5.1) miniport driver interface 308 and a file stream interface 310. Through the NDIS interface, a TCP/IP protocol stack (or layer) 312 exchanges packets with the IVLAN driver 306, enabling existing applications 314 to run over the IVLAN, and communicate with other P2P graph nodes, or communicate over a physical NIC 316 with public nodes. Through the file stream interface 310 the IVLAN driver 306 passes these IP packets to the IVLAN application for routing and transmission over the P2P graph.

The IVLAN user application 304 controls and configures the VNIC driver 308 and, sends and receives IP packets on behalf of the VNIC 302. The IVLAN application 304 uses, in one embodiment, the Windows™ P2P SDK (software development kit) to form and maintain an overlay network (or graph) connecting all nodes of an IVLAN. As described hereinbelow, the Windows P2P SDK can support message flooding through the graph links, point-to-point TCP connections for direct communication between participating nodes, and a replicated database among graph nodes. The IVLAN user application 304 extends this behavior by introducing a routing protocol enabling multi-hop message routing over the P2P graph. In one implementation, the ad hoc on-demand distance vector routing protocol (AODV) is employed because the protocol minimizes control traffic overhead and maximizes performance. AODV's on-demand nature enables quick reaction to changes in the graph conditions. Additionally, the protocol always finds the routes providing the minimum latency between two nodes.

When the IVLAN application 304 starts, it enables the VNIC driver interface 308 and assigns IPv4 and IPv6 addresses to the VNIC 302. Thus, every Ethernet packet arriving from the TCP/IP stack 312 and targeting the VNIC interface 308 is caught by the VNIC driver 306 and forwarded to the IVLAN user application 304 through the file stream interface 310 using CreateFile( ), ReadFile( ), and WriteFile( ) APIs, for example. The file stream interface 310 interface allows an IVLAN user application 304 to directly communicate with an in-kernel device driver through a file name exposed in the file system.

Ethernet packets are then encapsulated inside P2P messages and passed to the P2P graph for routing to the designated destination (via TCP/IP connections over the physical NIC 316). Only IP packets are routed in the graph while non-IP Ethernet packets (e.g., ARP-address resolution protocol, IPv6 neighbor solicitations) are handled locally or simply dropped.

On the destination node, the IVLAN user application receives the traffic through neighbor nodes in the graph. The destination extracts the Ethernet packets from the received P2P messages and passes the packets to the associated VNIC. The VNIC forwards the Ethernet packets into the TCP/IP stack as if the packets had arrived from a physical network controller 316.

Figure 4:
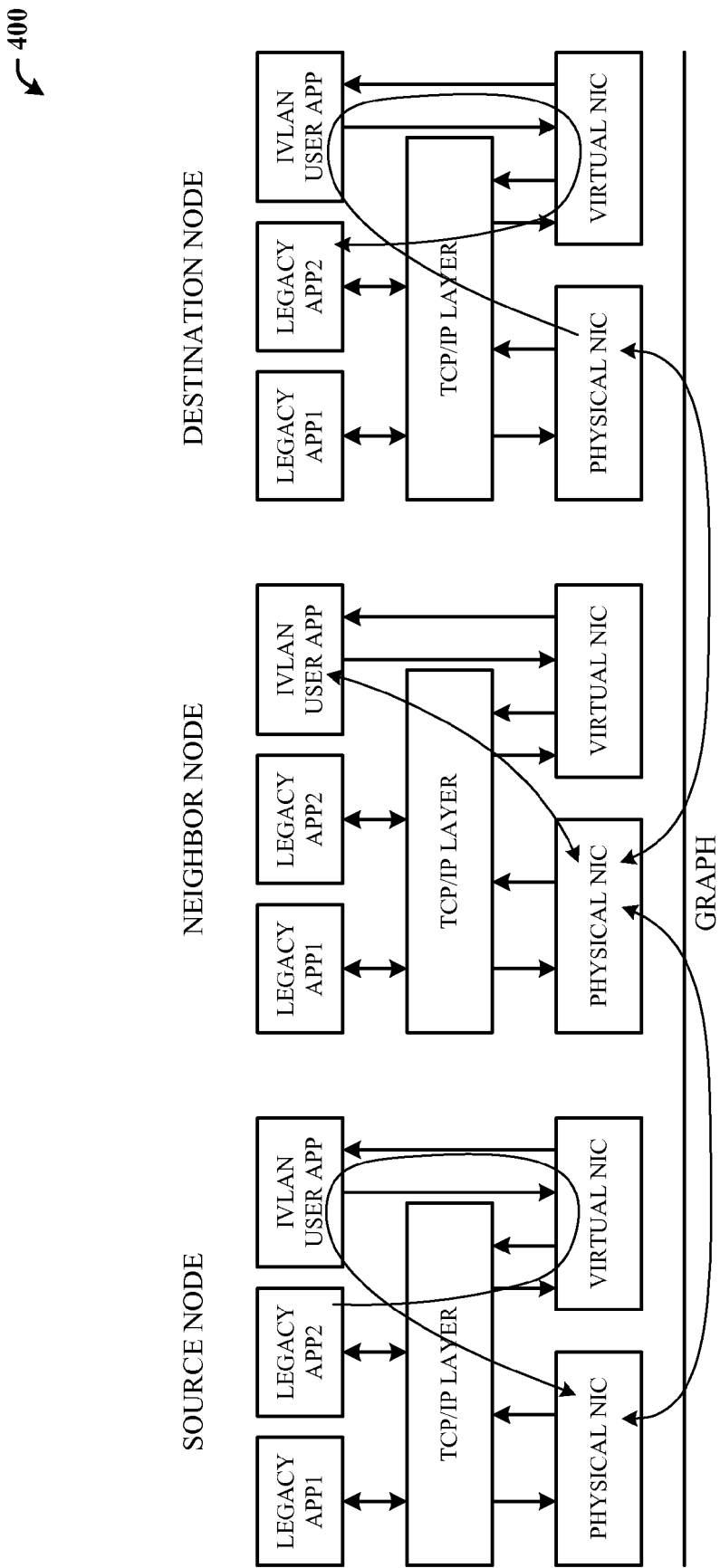
FIG. 4 illustrates an exemplary communication between two IVLAN nodes.

FIG. 4 illustrates an exemplary communication between two IVLAN nodes. A source legacy application (denoted LEGACY APP2) of a source node initiates packet traffic to a destination application of a destination node. The packet traffic is intercepted by the source VNIC and routed by the source P2P user application (denoted IVLAN USER APP) through the source TCP/IP layer to the source physical NIC (denoted PHYSICAL NIC). The source physical NIC routes the traffic through the graph to a neighbor physical NIC of a neighbor node, which routes the traffic to the neighbor P2P user application. The neighbor P2P application checks the P2P encapsulation on the packets and returns the traffic to the neighbor physical NIC for routing over the graph to a destination physical NIC. The destination physical NIC routes the traffic up the destination stack to a destination P2P user application for routing through the destination VNIC to an intended destination legacy application.

As previously described, and which will be illustrated in greater detail herein, the disclosed architecture provides a solution for legacy applications leveraging a standard communication layer such as IP could be supported over a P2P network overlay to provide a serverless VPN. The architecture enables many applications normally running only in a single physical network to actually be used in a completely distributed way. In situations where no network infrastructure exists, such as for first responders in emergency scenarios associated with earthquakes and fires, for example, the disclosed architecture enables IP applications to be used over a set of devices communicating with each other through multi-hop ad hoc and heterogeneous communication links (Wi-Fi, Bluetooth, etc).

The following scenarios present the application of P2P-based VPNs. These scenarios describe exemplary implementations of how a virtual IP overlay network can be utilized.

Figure 5:
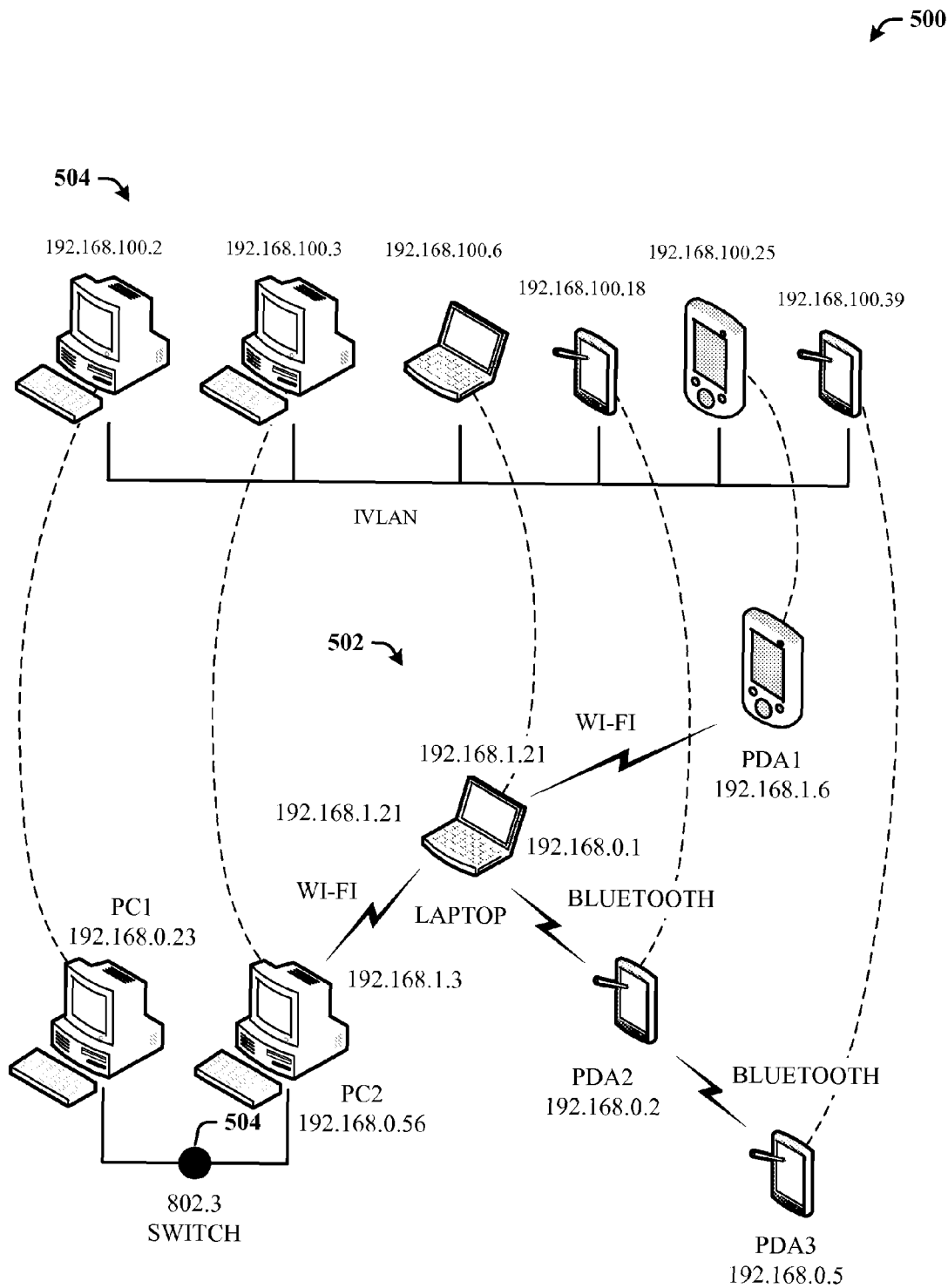
FIG. 5 illustrates a VPN in a heterogeneous network environment.

FIG. 5 illustrates a VPN in a heterogeneous network environment 500. In this scenario, different devices (e.g., PCs, laptops, PDAs, etc.) are connected to each other in an ad hoc network 502 and use heterogeneous links (Wi-Fi, Bluetooth, etc.) for communications. Such scenario is most likely to be possible in emergency situations where no network infrastructure is available.

Here, PC1 and PC2 are connected via a wire Ethernet switch 504 and have IP addresses 192.168.0.23 and 192.168.0.56, respectively. PC2 also has a wireless (e.g., Wi-Fi) adapter through which PC2 is connected to a Laptop in the ad hoc wireless network 502. The Wi-Fi adapter in PC2 is assigned IP address 192.168.1.3. The Wi-Fi adapter in the Laptop has IP address 192.168.1.21. The Laptop can also be connected to a PDA1 using Wi-Fi in an ad hoc manner. PDA1 has an IP address 192.168.1.6.

The Laptop can also have a Bluetooth adapter through which it is connected to a PDA2 and a PDA3 in a personal area network (PAN). In the PAN, the Laptop, PDA2 and PDA3 have IP addresses 192.168.0.1, 192.168.0.2 and 192.168.0.5, respectively.

Clearly, it might not be possible for any of the devices to communicate with all the other devices in the current scenario. For example, PC1 cannot communicate with the Laptop or PDA1, PDA2 and PDA3. Similarly, PDA1 cannot communicate with PDA2, PDA3, PC1 and PC2. The problem is that the devices do not belong to a single LAN so that applications relying on the ability to discover other nodes through broadcast and/or multicast may not run. In such ad hoc environment 502, a P2P-based virtual IP network 504 provides a benefit. Now after connecting via the P2P-based VPN 504, all the devices become part of a single virtual LAN (or subnet), and thus, can communicate with all the members. The IP packets are routed among the devices over the P2P overlay.

Figure 6:
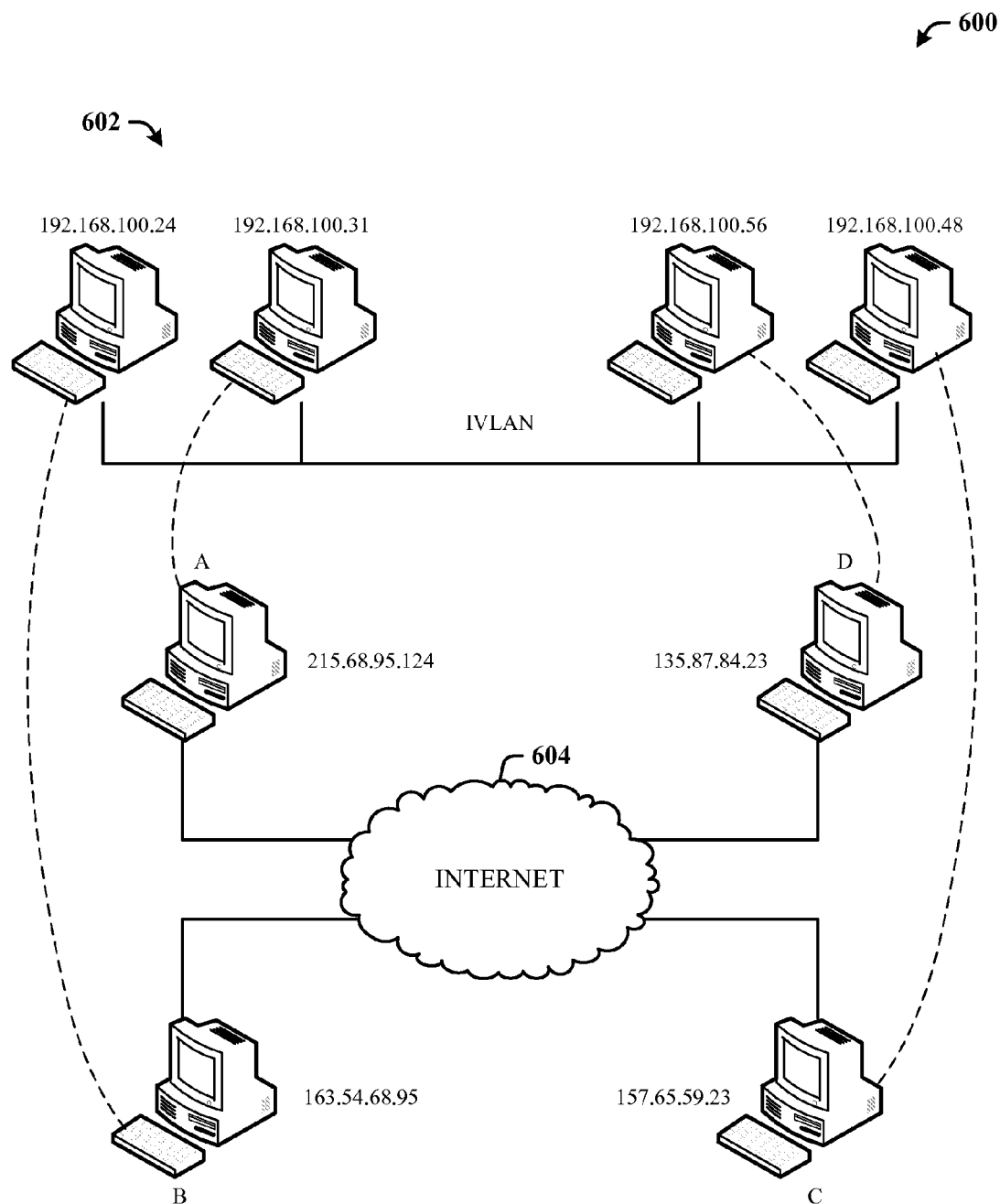
FIG. 6 illustrates a system that employs the disclosed IVLAN over the Internet.

FIG. 6 illustrates a system 600 that employs the disclosed IVLAN 602 over the Internet 604. The IVLAN 602 can also provide connection among networked computers with Internet access. All the computers connected to the IVLAN 602 will be able to access each other just as in the LAN, even though the computers are behind router/firewall/NAT devices and only have private IP addresses. The uniqueness of the IVLAN 602 compared with a traditional VPN is the serverless and non-centralized nature. This enables a handful of applications to run over IVLAN 602 which could not be run otherwise. For example, an IVLAN can be used to create a virtual LAN between computers connected through the Internet, thus, enabling the computers to play multiplayer games or to run applications that can only be run in a local network.

The IVLAN 602 can also be used for business needs of organizations. For organizations needing a VPN to connect multiple branch offices, the IVLAN 602 can be used as a serverless VPN. Otherwise, using a traditional VPN solution requires finding a fixed public IP address and the hosting a VPN server in each office. Additionally, there is neither a central bottleneck nor a single point of failure when using the IVLAN 602.

The IVLAN 602 also enables the use of remote access software without the need of knowing the public IP address or requiring the need for changing the router or firewall settings to map a port to the PC. This is very convenient with the IVLAN 602. As long as the computers are part of the IVLAN 602 using the same peer IDs, the computers can communicate with each other using the peer IDs as computer names.

Computers on the Internet are given dynamic IP addresses through DHCP (dynamic host configuration protocol), shared or filtered IP addresses through NAT (network address translation) devices, or IP addresses that are very hard to reach due to firewalls. Creating TCP/IP communication under such conditions is either impossible or requires elaborate application-level ruses to bypass these restrictions. TCP/IP sockets and server sockets also depend on the DNS (domain name server) to resolve human-friendly host names into the IP addresses. The standard DNS does not deal well with the computers that have filtered or dynamic IP addresses and updates take too long to propagate. Developers who wish to create applications that extend DNS into new directions, such as storing instant messaging usernames and presence information in the DNS, are stymied by the DNS system's technical and political issues.

These problems can be resolved by implementing the disclosed IVLAN architecture. Every peer on the network is then given a unique IP-address, even if the peer is behind a firewall or does not have a stable IP address in its home network.

In a P2P-based Internet, a peer wishing to become server simply publishes the name record for the domain name the peer wants and creates a server socket listening at a port that other peers should use to contact. Other peers can now directly open client socket connections to the peer. This P2P-based Internet brings many advantages. First, domain names could have any form such as MyTestDomain19, AlphaBravoCharlie or Hollywood-Movies or traditional www.mytestdomain.com. Secondly, one or more peers can publish the same DNS name. In that case some of the client requests to a domain published by two or more peers can be handled by some peers and the rest by some other peers. This is analogous to the DNS round-robin where one host name resolves to many different IP addresses to help load balancing. Third, the service ports for a given host name can be distributed across many different peers around the world. One peer could be hosting port 80 to serve web pages while some other peer could be hosting port 3000 for instant messaging.

With respect to IP address assignment, every node in the virtual IP network should be able to get a unique IP address. For the IVLAN architecture, the following schemes can be used to assign IP addresses to the VNIC interface and to map IP addresses to peer IDs.

In a first scheme, a peer ID can be used as an IP address for the VNIC. The advantage with this scheme is that it is the simplest scheme. Here, an administrator is required to setup a tap device in the host and bring it up with an IP address that is unique in the virtual IP address space. Since all the communication on the P2P network is based on peer ID (or node ID), a mechanism is needed to map IP addresses to peer IDs (or node IDs).

A second scheme uses a dynamic unique IP as published record. This second scheme uses the ability of the P2P graph to maintain a replicated database in order to publish the list of used IP addresses. A joining peer first checks its local database for a valid IP address record published previously by itself, and if one is found, assigns that IP address to its VNIC. If a joining peer does not find any self-published valid IP address record, then the joining peer checks its local database for all the IP address records published by all the nodes and then chooses a random IP address not found in any of the published IP records. The joining peer publishes this new IP address record in the form of "<new_IP>:<random_number>" with an expiry equal to TEMP_IP_EXPIRY (e.g., one min). The random_number could be the node ID of the joining node or hash of peer ID of joining node.

Instead of publishing the temporary IP record in the graph, broadcasting of IP record via a routing manager can be done as well. If a conflict is not found within this temporary IP expiry time, the joining node assumes that nobody is using this address and permanently assigns it to the joining node's VNIC. The node also publishes the IP address record in the graph with a longer expiry time (e.g., seven days). In case of a conflict, the node having published the temporary IP record with random_number nearer to ZERO will win, and the other node will select another random IP address and then repeat the whole process. Each peer, after obtaining a successful IP address, publishes its IP address record in the graph with an expiry time (e.g., seven days). In case the peer is online and the IP address record published by the peer is about to expire, the peer again republishes/updates the IP address record with a new expiry time.

This second scheme has several advantages. First, compared with the first scheme, a user does not have to use a peer ID in the form of an IP address, and thus, can use any arbitrary peer ID. Secondly, the user simply has to ensure that a unique peer ID is being used and does not have to bother about uniqueness of IP address. The unique peer ID is easier to ensure than unique IP address because any arbitrary string can be used as peer ID. Thus, this second scheme is suitable for users having no or little knowledge about networking, as compared to the first scheme in which each user has to ensure that the peer ID in the form of IP address should have same network ID but unique host ID.

In the IVLAN architecture, only IP-based Ethernet packets are routed in the graph, while all non-IP based packets are discarded. An exception is for ARP and ICMPv6 request packets. ARP requests are used with IPv4 to resolve a destination IP address to a MAC (media access control) address when the address is in the same subnet as the address of the resolving node. ARP requests are broadcast at the link layer and a possible way to support ARP requests would be to use the flooding support of the graph for broadcasting.

Instead of discarding or using the graph to resolve ARP requests, ARP requests can be handled locally by each node inside the VNIC driver. The MAC addresses for the different VNIC are derived by a static algorithm from the virtual IP address associated to the node. As a consequence, when the VNIC driver receives an ARP request packet for an IP address A.B.C.D (e.g., 192.168.100.35) the driver creates an ARP reply in which the MAC address for the requested IP address is generated locally. The same mechanism can be employed to handle ICMP v6 neighbor solicitations when the virtual network uses IPv6 addresses and needs to resolve such addresses to MAC addresses.

In one implementation, MAC addresses are generated from IP addresses by prefixing 00-FF at the beginning of the IP addresses. Thus, for an IP address 192.168.100.35 (C0.A8.64.23 in hexadecimal), the generated MAC address is 00-FF-C0-A8-64-23.

Dynamic name resolution of a name to an IP address is something that users have been used to, and hence, should be supported inside the virtual IP network. The traditional mechanism used for name resolution is DNS. However, it is likely that no DNS server will be present in a virtual IP network. Thus, a different name resolution mechanism should be utilized.

One mechanism for publishing names uses the support of the graph to publish name resolution records. When a peer node adds a name record in the graph, the record is automatically flooded to all the nodes in the virtual network and stored in their database. Each name resolution record can have an associated expiration time (e.g., seven days). Each node is responsible for republishing/updating the name resolution record before its expiration.

One advantage of the disclosed IVLAN architecture is an alternative P2P domain name system which responds to updates much quicker than standard DNS. The IVLAN provides P2P-based name resolution. Since P2P name resolution does not use the DNS system, host names can be any string. Additionally, a peer can publish one or several names corresponding to different websites or web services.

The standard name resolver implemented in the TCP/IP stack in the operating system may not be aware of the underlying P2P graph so the graph cannot be used directly to resolve names. The resolver first checks the local name for mapping from name to IP address, then checks the hosts file for the mapping, and if not found, then sends the DNS query to the DNS server. The following two schemes can be used to resolve network names to IP addresses, and then further, to peer IDs.

A first resolving scheme uses a host file. Here, each peer maintains a list (called NameList or NL) of peer IDs, IP addresses, and name records published by all the peers. When a peer receives a new name record Nr published by a peer having peer ID Pid and having a unique IP address IPr, then it adds this in its NL. The peer also inserts an entry in the host file. When a name record is expired or deleted then the entry is also deleted from the NL and hosts file.

Figure 7:
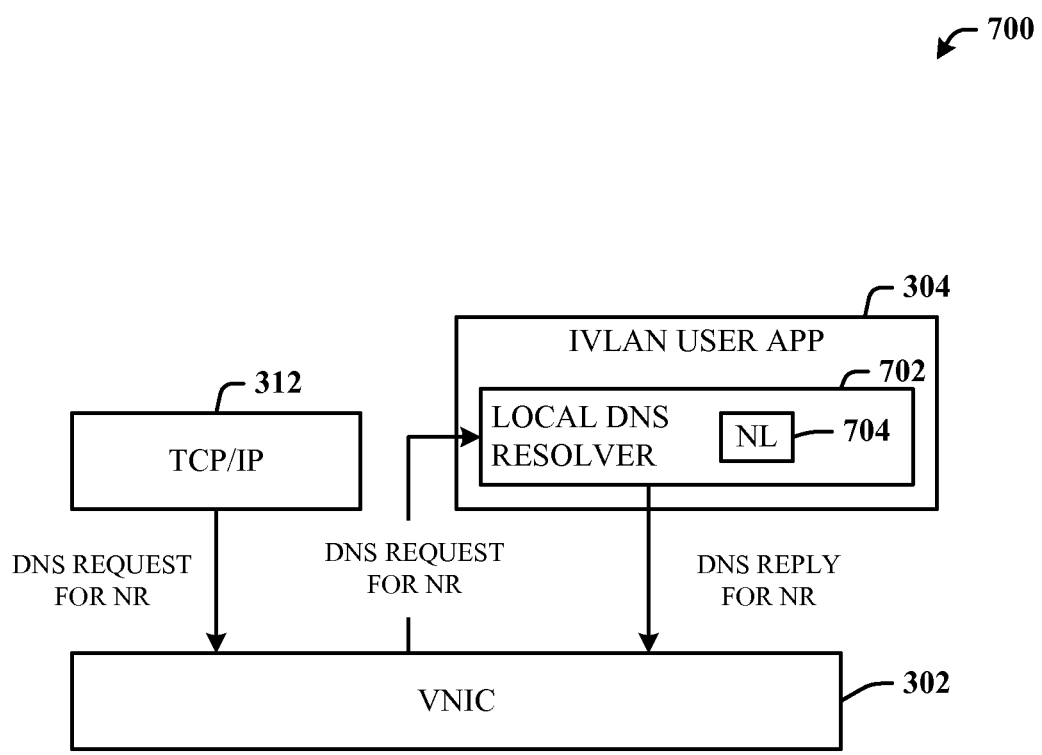
FIG. 7 illustrates a system that employs a local DNS resolver component built inside an IVLAN for name resolution over an IVLAN graph.

A second resolving scheme that uses a local DNS resolver component. FIG. 7 illustrates a system 700 that employs a local DNS resolver component 702 built inside the IVLAN for name resolution over an IVLAN graph. Here, rather than adding name records in hosts file, each peer implements the local DNS resolver component 702 as part of the IVLAN user application 304 to resolve all the DNS requests locally. The resolver component 702 maintains an NL list 704 of peer IDs, IP addresses, and name records published by all the peers, and provides updates through the record flooding mechanism of the graph. When a peer receives a new name Nr record published by a peer having peer ID Pid and having a unique IP address IPr, the peer adds a new entry in the NL 704. When a name record is expired or deleted, the corresponding is also deleted from the NL 704.

In an IVLAN network using this scheme, an arbitrary IP address is fixed for a virtual DNS server which is then not used by any peer present in the virtual network. When a name resolution (DNS) request is generated for a name Nr, the VNIC 302 receives the request from the TCP/IP stack 312 and forwards the request to the IVLAN application 304. The IVLAN user application 304 checks all the IP packets received from the local VNIC 302 and if the IP packet is a DNS request, the user application 304 passes the DNS request to the local DNS resolver component 702. The local DNS resolver component 702 goes through the list 704 of published names (NL) and replies with the IP address IPr assigned to peer (having peer ID IP) which publishes the name record Nr. Thereafter, any IP packet received for the destination IP IPr is forwarded to the peer having peer ID PI.

A difference between this second resolving scheme and the previous scheme is that here, multiple peers can publish a single domain name, and the local DNS resolver can route some of the requests to one peer and some requests to other peers for load balancing. Additionally, changing the hosts file is not suitable because if the IVLAN graph terminates unexpectedly then the name record entries entered in the hosts file will remain there and the file will not be restored to its original form. Note that name resolution is also supported through multicast DNS, which uses the ability of the IVLAN to support multicast semantics.

One of the many benefits of overlaying IP on a P2P network is that routing over the overlay can cross firewalls and NATs. This is achieved because all the routing of IP packets (of virtual IP network) is done by a routing manager introduced in the graphing component of P2P SDK. The routing manager routes all the IP packets (of virtual IP network) over the P2P graph, and thus, once a node is part of P2P graph then it is possible to send data or communicate over virtual IP network to any other node in the graph even if behind NAT or firewall in physical IP network.

An advantage of overlaying IP on a P2P network is device mobility. Conventionally, in a physical IP network two devices can only communicate with each other if the corresponding IP addresses are known. If during communication any one of the device changes its IP address to some other random IP address then the communication breaks. The second device then needs to know the new IP address of the first device for communication to proceed. The disclosed IVLAN architecture intrinsically supports device mobility. Since peer IDs are used to route messages over the P2P overlay network, a node in the virtual IP network can communicate with another node as long as the other node connects to the P2P graph (or virtual IP network) with the same peer ID even though the peer is changing its IP address in its physical NIC.

Figure 8:
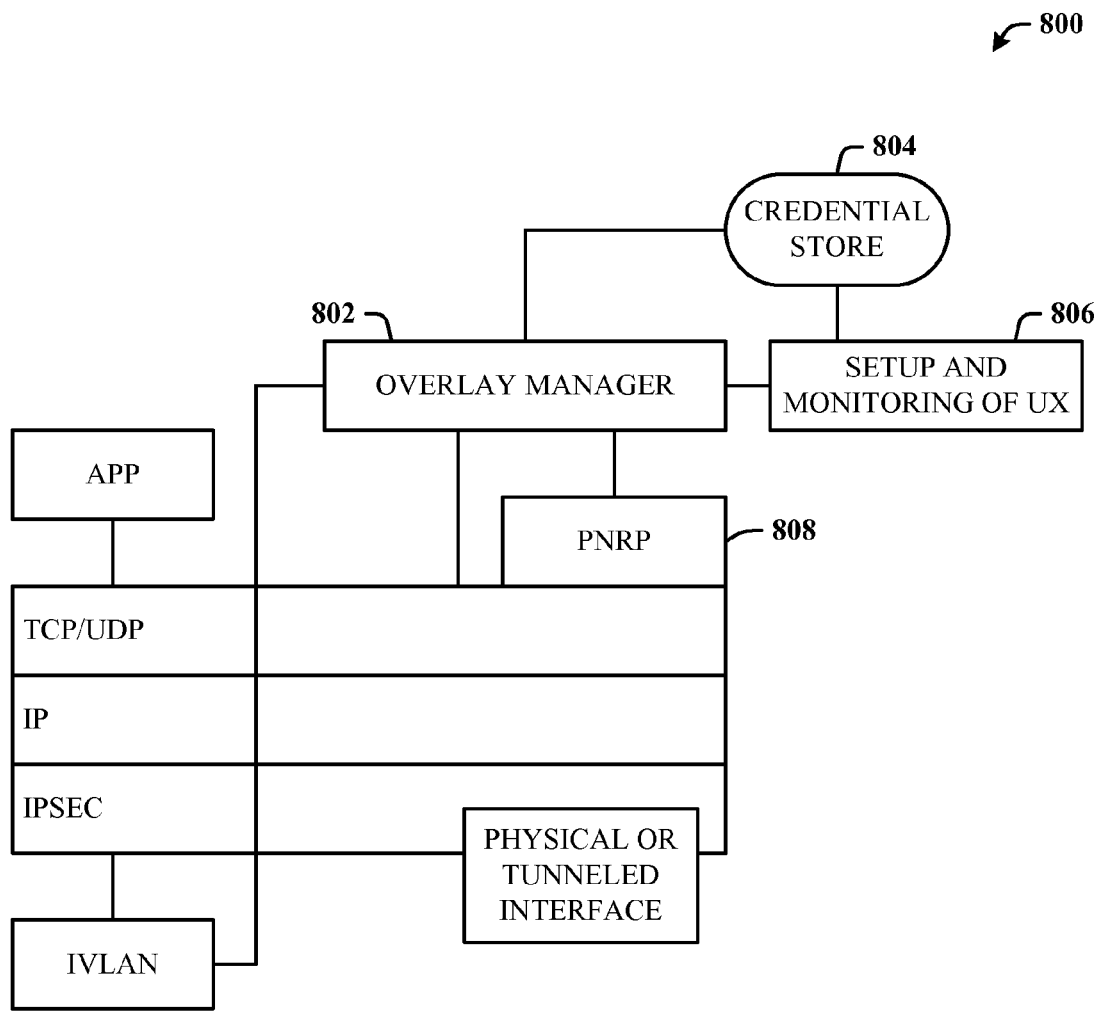
FIG. 8 illustrates an alternative implementation of a system for VLAN access of private network devices.

FIG. 8 illustrates an alternative implementation of a system 800 for virtual LAN access of private network devices. In this particular implementation, the system 800 encapsulates the functionality in an NDIS miniport driver and user-mode process. The NDIS driver exposes the virtual interface (with an IPv4 and/or IPv6 address) and passes all packets to a user-mode overlay manager 802 (e.g., the IVLAN user application 304). The overlay manager 802 is responsible for at least several operations: authentication into the IVLAN using a credential store 804, discovery and selection of neighboring devices, routing management, and packet forwarding. A setup interface 806 (e.g., similar to a VPN client) enables the user to configure new IVLANs, and to configure IVLANs to launch, either on demand or automatically on boot.

In an alternative implementation, the overlay manager 802 is employed to create a routing scheme on the local node, but then utilize the properties of IP to route the packets. In other words, rather than having the P2P exposed as a miniport driver that communicates back up to the user mode processes, it will be the user mode processes that are simply driving a level in the stack that is almost to the equivalent of TCP/UDP. This latter implementation gets around the kernel mode to user mode back to kernel mode operations and all of the TCP encapsulation that could happen. Thus, by creating the network at the IP layer or TCP/UDP layer, better performance can be achieved. The overlay manager 802 can communicated with the stack using PNRP (peer name resolution protocol) 808, for example. A link local multicast name resolution (LMNR) protocol can also be employed since the IVLAN supports packet multicasting.

Figure 9:
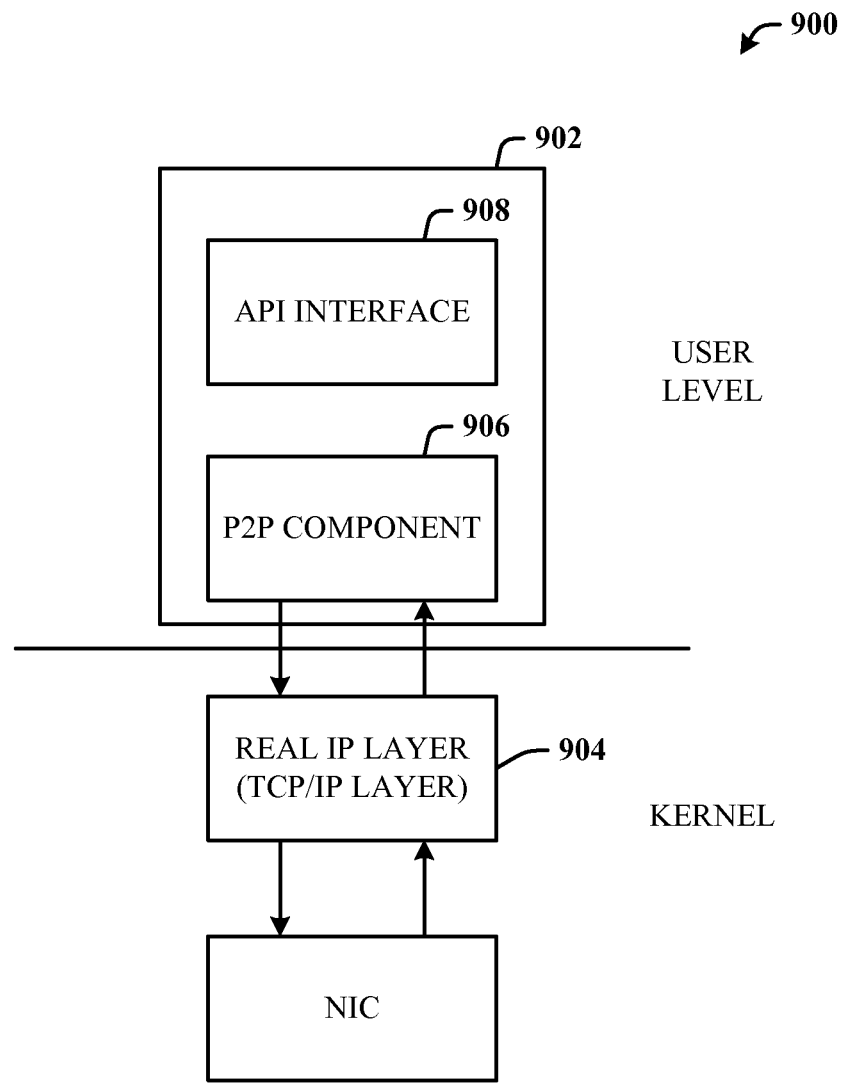
FIG. 9 illustrates an alternative implementation via a user-level intermediate layer.

The logical architecture 200 of FIG. 2 of the IVLAN does not require that when a virtual IP layer on top of P2P, a new TCP/IP layer should be designed and developed. Following are different possible approaches through which this could be achieved. FIG. 9 illustrates an alternative implementation 900 via a user-level intermediate layer 902. The user-level intermediate layer 902 is introduced above the TCP/IP layer 904. The intermediate layer 902 maintains P2P connections with other nodes in the P2P network using a P2P component 906, and provides an API 908 to applications for interfacing to the P2P network. This API 908 can be similar to standard socket APIs which will allow programmers to develop applications utilizing the power of an IVLAN layer based on knowledge of network socket communications.

Figure 10:
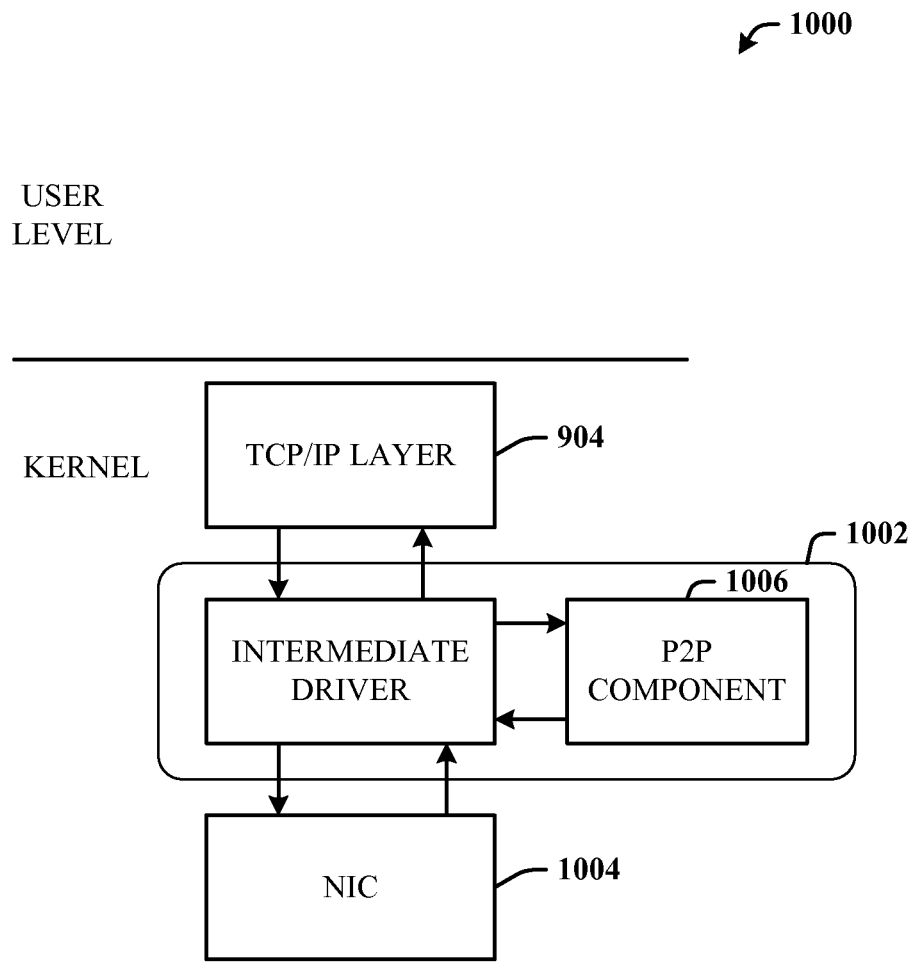
FIG. 10 illustrates an alternative implementation that employs a kernel-level intermediate layer.

FIG. 10 illustrates an alternative implementation 1000 that employs a kernel-level intermediate layer 1002. In this approach, the kernel-level intermediate layer 1002 is introduced between the TCP/IP layer 904 and NIC driver 1004. The role of the intermediate layer is to bridge packets destined to the virtual IP layer, to the P2P network. There are approaches through which communications can be performed over the P2P overlay network. FIG. 10 shows one approach where the intermediate layer 1002 can include a built-in P2P component 1006 responsible for communication with the P2P network. While efficient, this solution can be difficult to manage since the support for the P2P network should be integrated in a kernel module.

Figure 11:
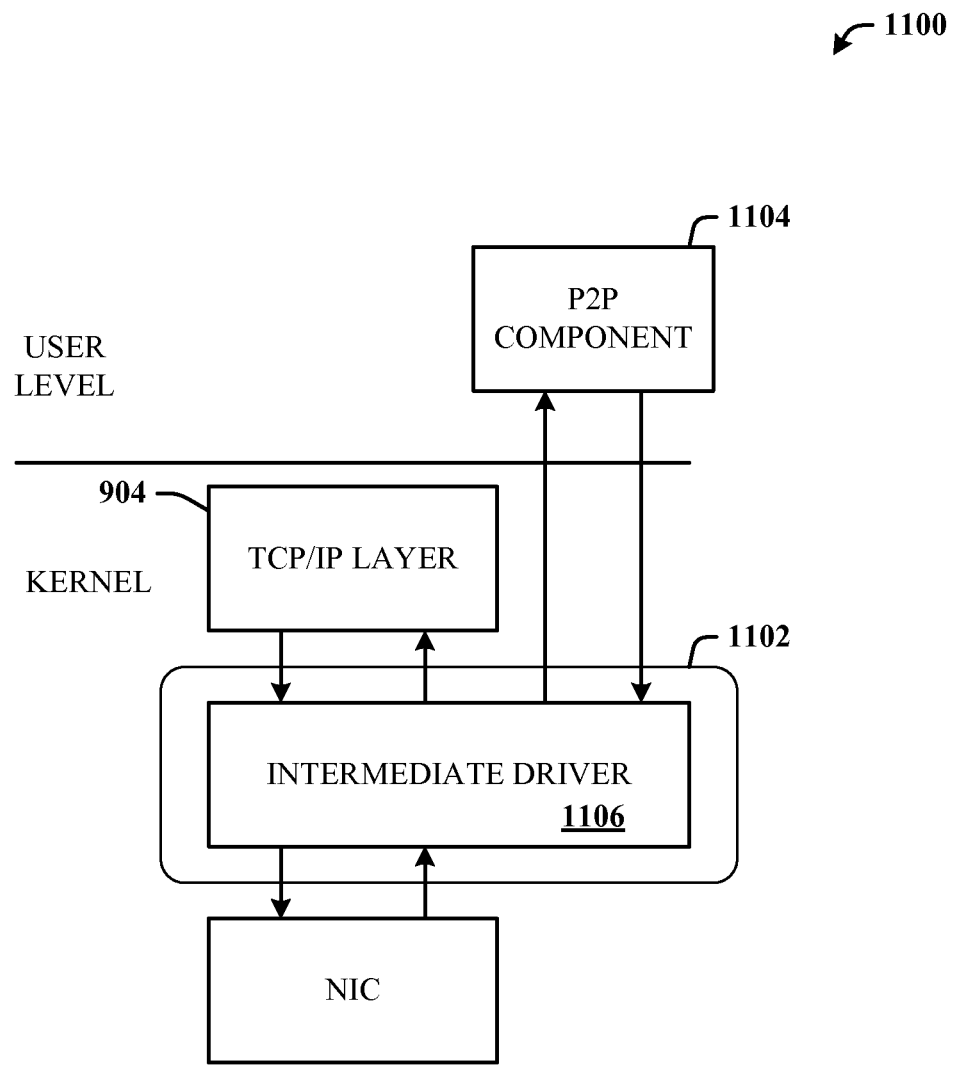
FIG. 11 illustrates an alternative approach where a kernel-level intermediate layer transfers all the IP packets received from TCP/IP layer for the virtual IP network to a user-level application.

FIG. 11 illustrates an alternative approach 1100 where a kernel-level intermediate layer 1102 transfers all the IP packets received from TCP/IP layer 904 for the virtual IP network to a user-level application (e.g., the P2P component) 1104 which in turn uses the P2P APIs to transfer packets to the destination node in the P2P network. The rest of the packets not destined to virtual IP network are passed to the physical NIC. In the operating system (e.g., Windows), for example, this layer can be implemented as an NDIS intermediate driver 1106.

Another alternative approach employs a kernel-level virtual NIC interface driver. In this approach, the kernel-level virtual NIC driver is introduced that appears to the TCP/IP layer as just another NIC. Conceptually, this approach is similar to the kernel-level intermediate layer approach. A difference is that the TCP/IP stack takes care of routing the packets to the right NIC so the driver does not need to determine if packets are destined to the VNIC. There are two approaches here as well through which communication can be done over the P2P overlay network.

Figure 12:
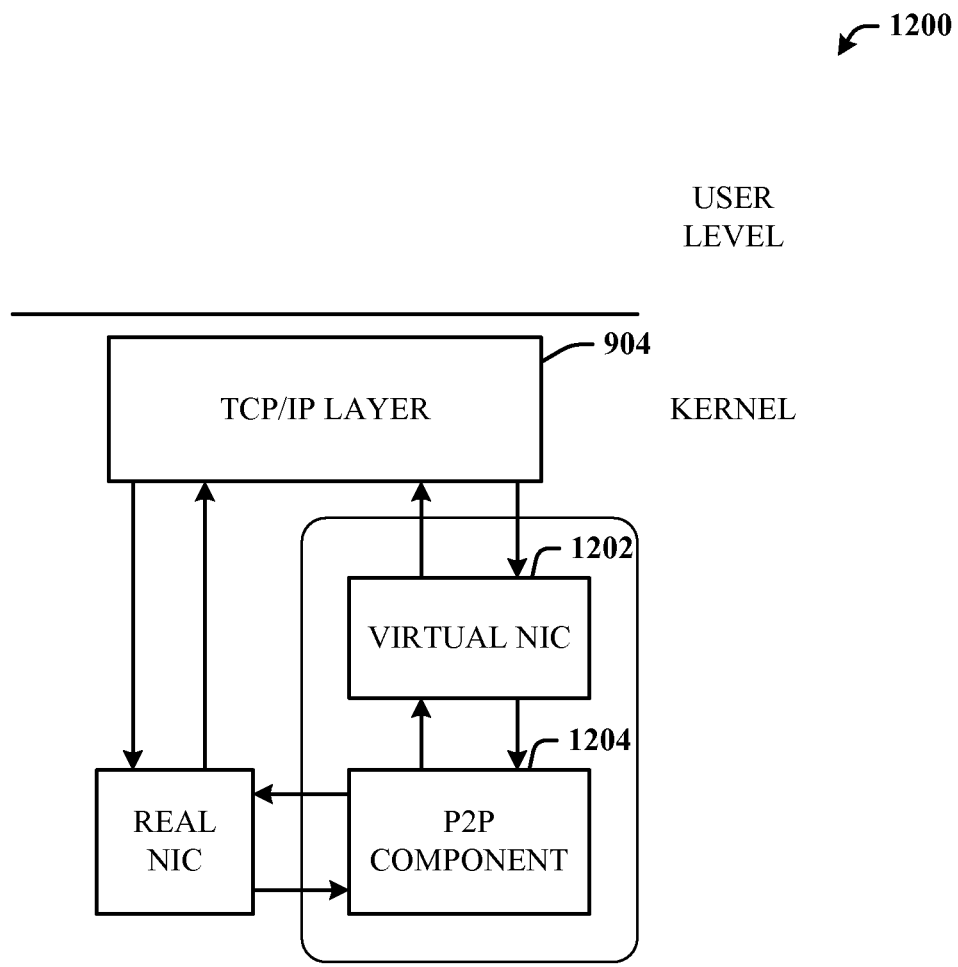
FIG. 12 illustrates an alternative approach that employs a kernel-level virtual NIC interface driver having a built-in P2P component.

FIG. 12 illustrates an alternative approach 1200 that employs a kernel-level virtual NIC interface driver 1202 having a built-in P2P component 1204. The P2P component 1204 is responsible for communications with the P2P network. This solution has the same disadvantage as the kernel-level intermediate layer using a built-in P2P component 1006 of FIG. 10.

The Microsoft P2P SDK is a set of networking APIs that enable application programmers to create P2P-based applications. The SDK is part of a bigger P2P networking platform which is a developer platform to create P2P applications.

Figure 13:
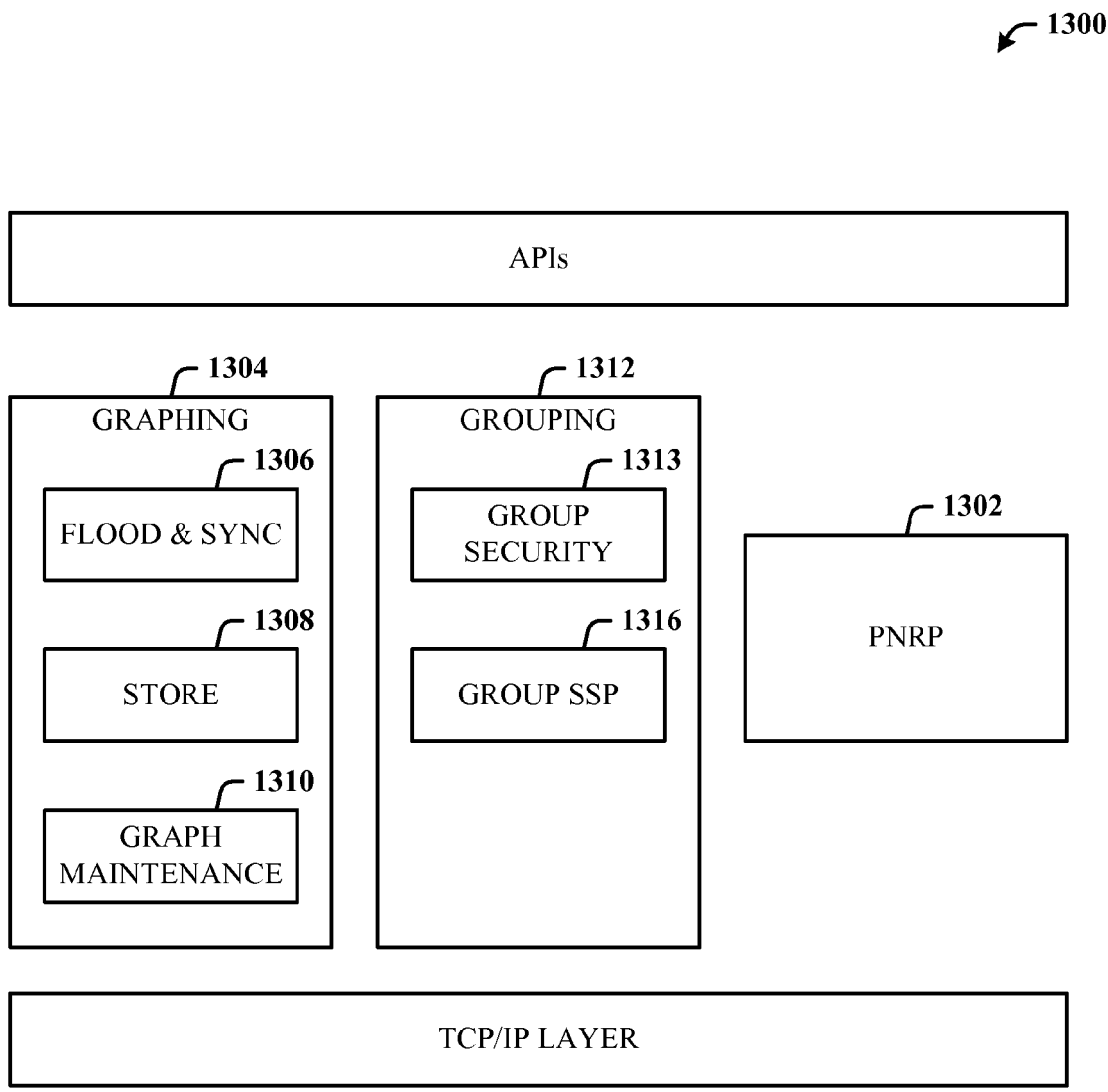
FIG. 13 illustrates one exemplary system for components for P2P networking architecture.

FIG. 13 illustrates one exemplary system 1300 for components for P2P networking architecture. The system 1300 includes a PNRP component 1302 that provides P2P name resolution. PNRP is a secure, serverless, scalable and dynamic name registration and name resolution protocol that uses architecture similar to a DHT (distributed hash table) system which resolves a peer name to an IPv6 address. A peer name is an endpoint for communication, which can be a computer, a user, a group, a service, etc. The peer name can be hashed to a 128-bit peer identifier and a DHT-like algorithm is used to retrieve the location of the host publishing that identifier. PNRP does not use a routing table, but rather a cache of PNRP entries. A cache maintenance algorithm ensures that each node maintains adequate knowledge of the cloud or a group of other nodes to resolve a peer name.

The system 1300 can also include a graphing component 1304 responsible for maintaining a mesh or graph of connected peers and, provides flooding and replication of data across the graph. The graph is an overlay over IP of nodes connected such that any node may communicate with all other nodes through a series of logical neighbor connections. A neighbor in a graph is a node that is one graph hop away (directly connected via a TCP connection).

A well-connected graph has a path between any two nodes. A graph has a "small diameter", that is, a relatively small number of hops between the nodes in the farthest edges of the graph. The graph is robust and remains connected even if some nodes or some connections disappear. As illustrated, of the graphing component 1304 uses a flood and synchronization subcomponent 1306, a database (or store) subcomponent 1308, and a graph maintenance subcomponent 1310.

With respect to the flooding and synchronization subcomponent 1306, the peer graph uses flooding to publish a data (or name) record in the graph. A record name is computed by appending a dot and the graph name to the host name. When a node publishes (or adds) a new record in the graph then this record is propagated to all the nodes via flooding. If a node makes any changes in an already published record (e.g., updates the record) then these updates are also propagated to all the nodes through flooding. If a node deletes a record then flooding also propagates this deletion to all the nodes in the graph. Each record published in the graph is uniquely identified by a globally unique identifier (GUID). Each record also has a version number and an age or status. A synchronization process also ensures that peers have the same set of records.

The graph maintenance subcomponent 1310 includes an algorithm that defines how the graph evolves, to maintain robust connectivity and to maintain a small diameter. The graph maintenance component 1310 achieves this by computing a signature of the graph and using the signature to detect partitions. If a graph is partitioned, each of the partitions will have a different signature. The graph maintenance subcomponent 1310 also allows a node to establish appropriate connections when the node enters the graph and leaves the graph without creating a "hole".

When records are published in the graph, a graph node that has multiple connections will receive multiple copies of the record. In order to decide which connections to keep and which to remove, graph node evaluates flooded records and calculates a bidirectional utility index of its connections. A utility index is a number that indicates the usefulness of the connection in transferring the published record. If a record is received from a connection that has already been previously received from some other connection then the utility index of the connection is decreased. Otherwise, if a new record is received through a connection then the utility index of that connection is increased. On an ongoing basis, the graph maintenance algorithm attempts to remove useless connections and establish new connections based on the utility indices of all of the connections a node has and the information that is received during the flooding. In this way, the algorithm tries to converge a graph to a topology that is optimal for flooding for the current traffic pattern.

In order to connect to the graph, a joining node connects to a node that is already connected to the graph. The joining node resolves the IPv6 address of the contact node in order to connect. This can be done through DNS, peer discovery and name resolution methods such as PNRP, for example, or any other customized method. If the selected contact node has less than a maximum allowable number of graph connections to neighbors, the node will send an accept response. Otherwise, the node will send a rejection response along with a referral list, which is a list of other nodes in the graph. The joining node that receives rejection response picks a random node in the referral list and tries to connect to it.

When a node disconnects from a graph, the node sends a disconnect message to the neighbor nodes (the adjacent nodes). The disconnect message carries a referral list, which includes neighbors, except the neighbor being disconnected from. When the other node receives a disconnect message, it tries to connect to a peer in the referral list. This helps in repairing any partition caused by disconnection of the node.

As nodes connect and disconnect from graphs, partitions in the graph may occur. Each graph has a graph signature and a number of contact nodes. The number of contact nodes is proportional to the size of the graph. The contact and graph signature information is refreshed periodically. If the contact and graph signature information becomes stale, a partition has occurred. When a partition is detected, an attempt to communicate with the contact node is made in order to reconnect the graph.

Graphs are the association of a set of nodes with connections that define a topology for flooding information. A graph by itself is unsecured. Security of the graph can be provided by pluggable modules in a group component 1312. Grouping is the combination of the PNRP component 1302, peer graphing (via the graphing component 1304) and a group security (via a security subcomponent 1314 and a group SSP (security support provider) 1316). Grouping provides management of credentials of the members of the group and the secure publication of records in the group.

The group security subcomponent 1314 uses a peer name to identify each member of the group and to identify each group. When a group is created, a new public/private key pair for the group is created, upon which a group name is based. The member that owns the private key corresponding to the peer name of the group is the group owner. Participation is restricted to a set of peers known as group members. Each group member requires security credentials to prove membership of a group. Once a peer becomes part of a group, the group members use graphing to establish multiple neighbor connections and optimize the shape of the graph for flooding.

Each peer has an associated peer database (or store 1308) which stores the set of records associated with a graph that are securely published and synchronized between all the members of the group. Graphing ensures that published records are propagated to all the nodes while grouping prevents unauthorized records from being propagated throughout the graph. The record replication between members uses SSL (secure socket layer) to provide encryption and data integrity for record data.

When a new peer joins the group, the new peer automatically receives all the published records from the current group member to which it attaches. After the initial synchronization, group members periodically resynchronize the published records to ensure that all the group members consistently have the same view of published data. A peer uses a local search mechanism to search for a published record. In a local search, the group member only searches its local peer database for the record and does not send search queries to other group members.

Following are a series of flow charts in support of methods of providing various aspects of the IVLAN architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 14:
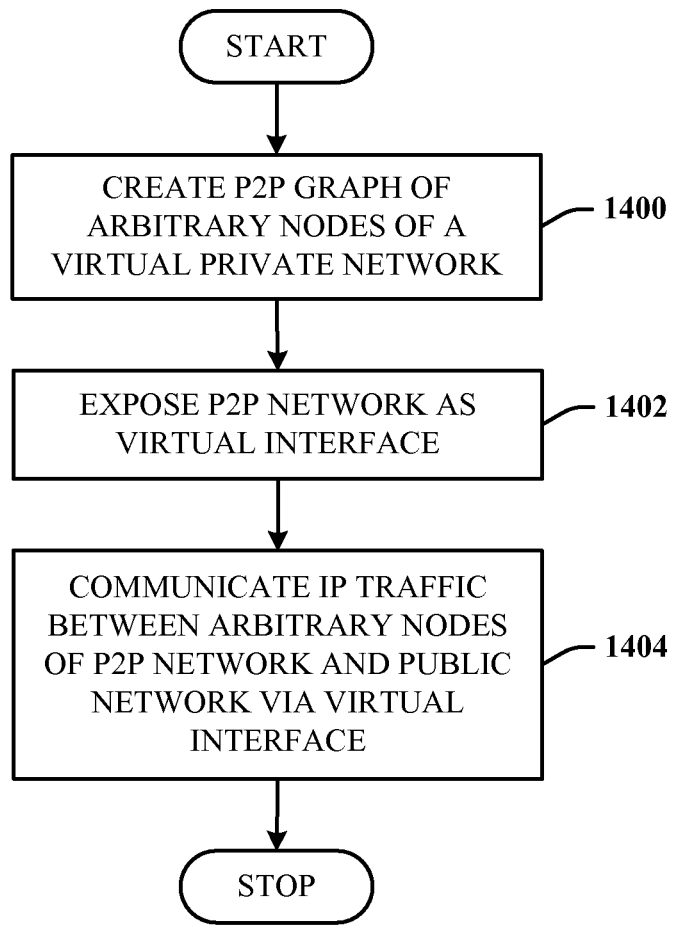
FIG. 14 illustrates a method of networking devices.

FIG. 14 illustrates a method of networking devices. At 1400, a P2P graph of arbitrary nodes of a virtual private network is created. At 1402, the P2P network is exposed as a virtual interface. At 1404, IP traffic is communicated between the arbitrary nodes of the P2P network and a public network via the virtual interface.

Figure 15:
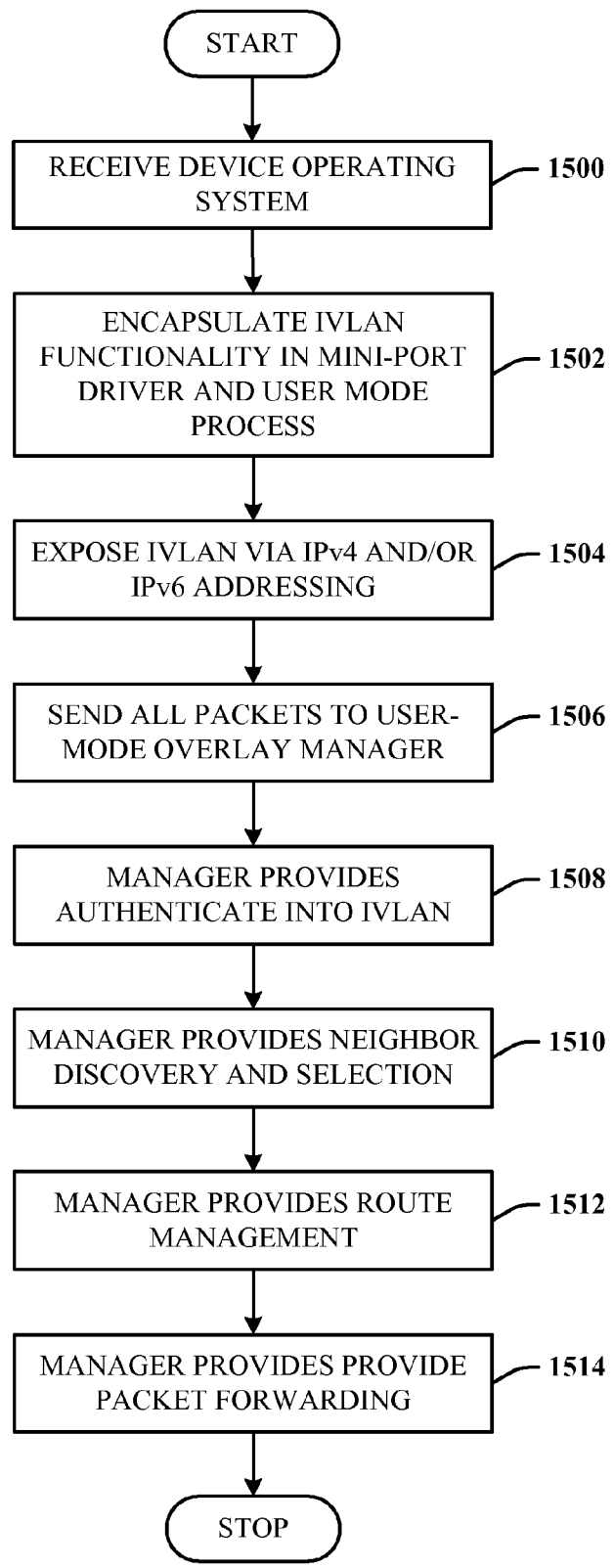
FIG. 15 illustrates a method of implementing a private VLAN.

FIG. 15 illustrates a method of implementing a private virtual LAN. At 1500, a device operating system is received. At 1502, IVLAN functionality is encapsulated as a mini-port driver (e.g., NDIS) and user-mode process as part of the operating system. At 1504, the IVLAN is exposed via the mini-port driver and user-mode process using an IPv4 and/or IPv6 protocol. At 1506, all packets received are sent to a user-mode overlay manager. At 1508, the manager provides authentication into the IVLAN. At 1510, the manager provides neighbor device discovery and selection. At 1512, the manager provides route management. At 1514, the manager provides packet forwarding to devices of the IVLAN.

Figure 16:
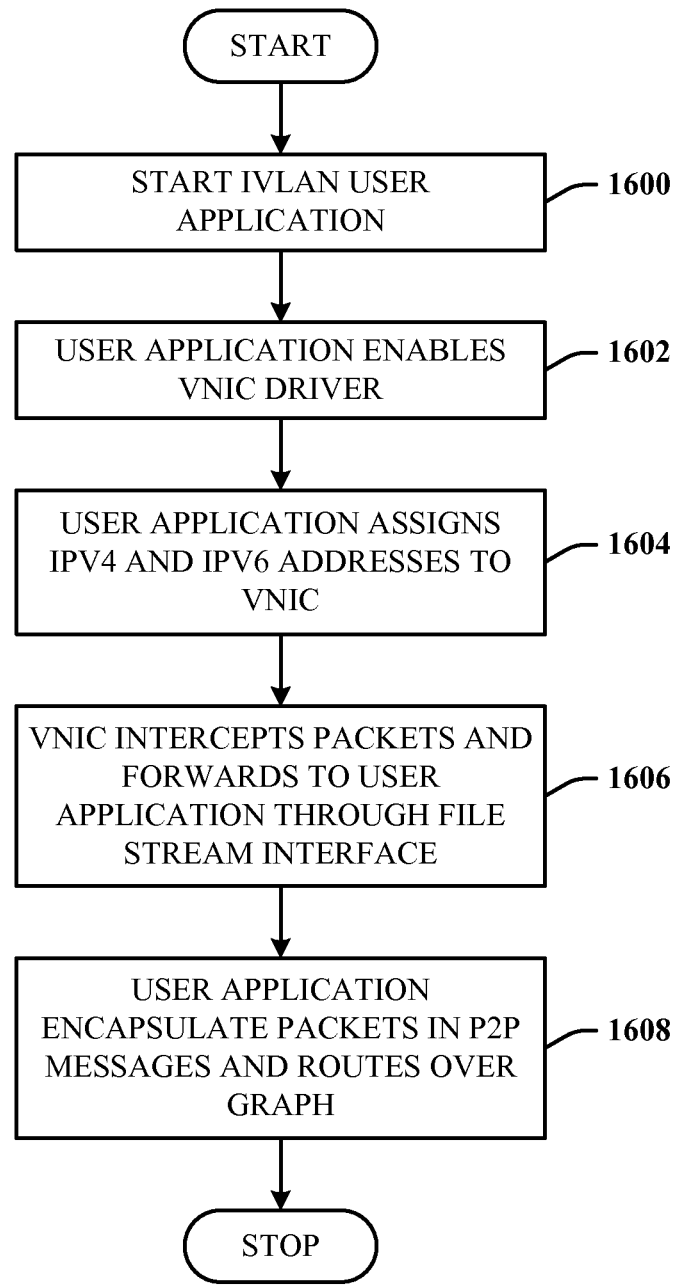
FIG. 16 illustrates a method of receiving and sending IP packets in the IVLAN architecture.

FIG. 16 illustrates a method of receiving and sending IP packets in the IVLAN architecture. At 1600, the IVLAN user application is started. At 1602, the user application enables a VNIC driver interface. At 1604, the user application assigns IPv4 and IPv6 addresses to the virtual interface. At 1606, packets received and intended to the VNIC interface are intercepted by the VNIC driver and forwarded to the user application through the file stream interface. At 1608, packets are encapsulated in P2P messages and routed over the graph to the destination.

Figure 17:
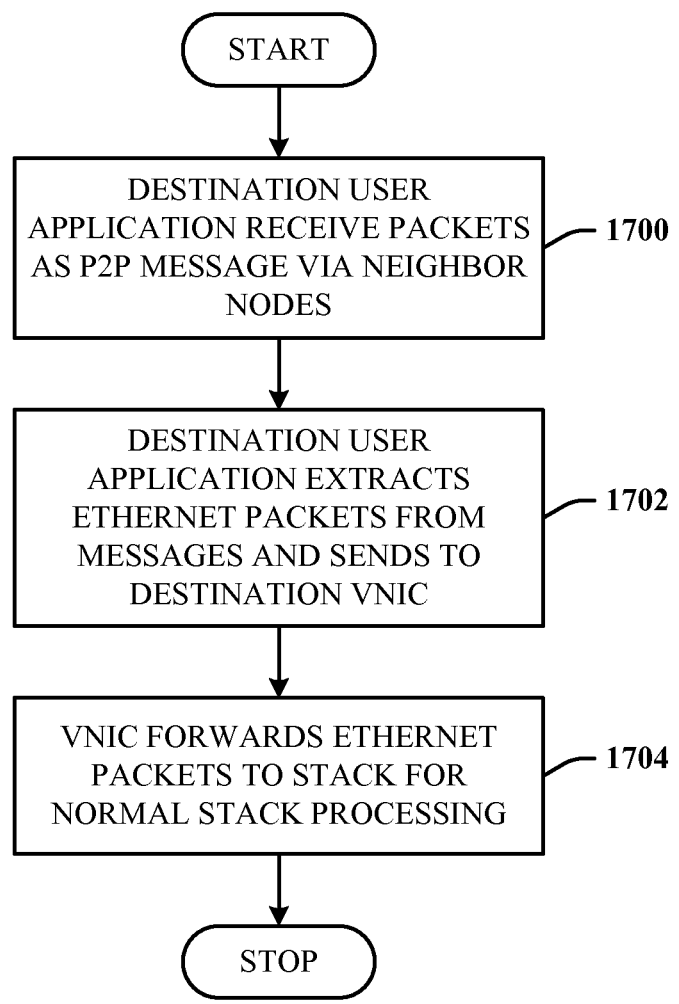
FIG. 17 illustrates a method of receiving and processing IP packets in the IVLAN architecture.

FIG. 17 illustrates a method of receiving and processing IP packets in the IVLAN architecture. At 1700, the destination user application receives packets through neighbor nodes. At 1702, the user application extracts Ethernet packets from the P2P messages and sends the Ethernet packets to the VNIC. At 1704, the VNIC forwards the Ethernet packets into the TCP/IP stack for normal stack processing.

Figure 18:
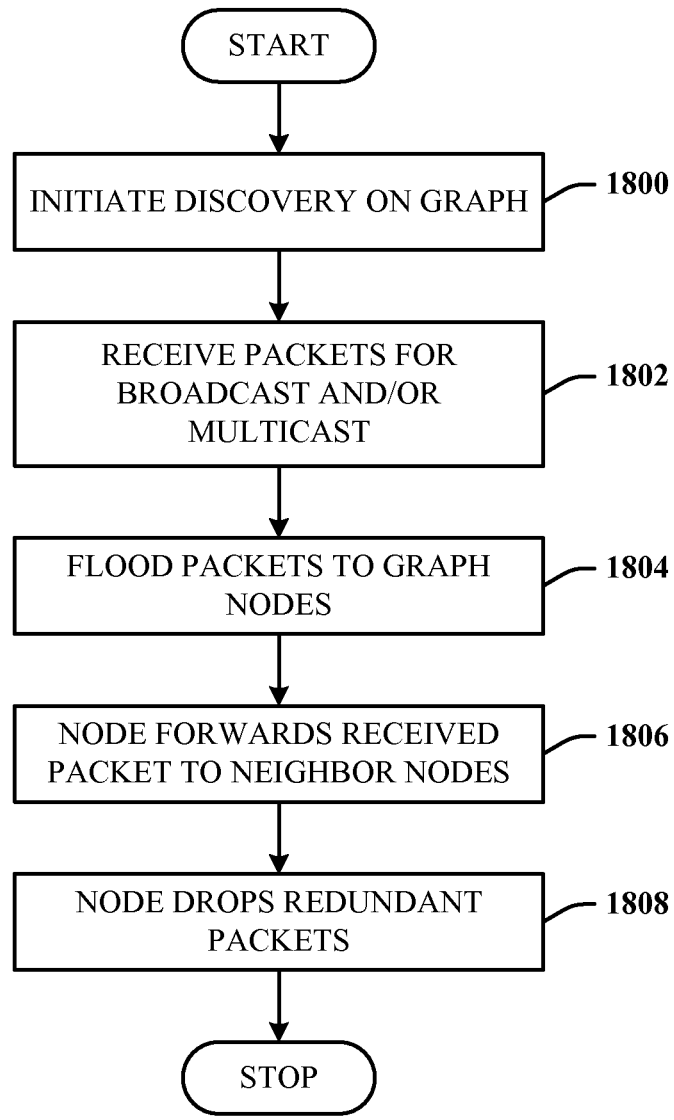
FIG. 18 illustrates a method of flooding packets in the graph.

FIG. 18 illustrates a method of flooding packets in the graph. At 1800, discovery on the graph is initiated. At 1802, packets are received for broadcast and/or multicast. At 1804, the packets are flooded to graph nodes. At 1806, a node forwards received packets to neighbor nodes. At 1808, a node drops redundant packets.

IVLANs are appropriate for bringing together a collection of Internet (or public network) hosts to facilitate a variety of applications. It can be assumed that IVLAN relationships are generally long-term. Accordingly, at least the following types of IVLANs can be created: a family IVLAN, an extended family IVLAN, and a social network IVLAN.

IVLANs provide the capability of supporting existing applications and experiences by providing broadcast semantics. Broadcast semantics imply that many existing protocols and applications will run unmodified over the virtual network. For instance, a network explorer can be used to discover resources across all machines within the IVLAN. Other broadcast experiences include discovering meeting, people and media.

IVLANs provide the capability of transparent "supernode" capabilities by providing forwarding semantics. Because IP routing operates over the IVLAN, connectivity is achieved among all hosts in the IVLAN, even when pairwise connectivity is not available. As a side effect, nodes with good connectivity can seamlessly act as forwarding agents for traffic between other hosts. This capability enables a supernode role that gets created automatically based on the dynamic connectivity of active hosts.

IVLANs also provide the capability of resilient communications. Dynamic overlay routing can be used to construct resilient networks that "route around" Internet congestion or failures. Moreover, an IVLAN can be employed (e.g., without broadcast semantics) for performing rapid virus signature propagation or software distribution.

Other benefits that can be enabled by IVLANs include file sharing and access (e.g., particularly media sharing). In other words, multiple PCs in a "home" can be enabled to share information there between no matter where the computers are located. In particular, the system can enable remote discovery and access to media sources (e.g., Media Center, media libraries, etc.). Live streaming (and even multi-party streaming) can be enabled. IVLANs provide seamless discovery of devices and other resources located in the "home". IVLANs facilitate home network management and troubleshooting by linking PCs that form a consumer management domain for easy remote network management. IVLANs promote remote access, including remote assistance and meetings. Additionally, content publication to friends and family by way of the creation of personal websites, for example, provides automatic and secure sharing to friends and family within the IVLAN.

It is within contemplation of the subject architecture that IVLANs can be exposed to users at the application level. In other words, users may perceive the IVLAN as "private networks" or "network circles." Therefore, applications may expose functionality in terms of these network circles. Consider, for example, a photo publishing application. Rather than asking the user to enumerate the individual users who may access the photos, the application may provide the option to "publish to your Family network circle." This automatically exposes the photos for access only through the corresponding IVLAN.

Application awareness of an IVLAN can be employed. If the application knows that it is using an IVLAN, the application can be configured to "see" actual neighbor links, thereby enabling higher-level systems such as DHTs to optimize for that topology.

In another implementation, multiple simultaneous IVLANs can be employed such that a client can join multiple IVLANs simultaneously. In one exemplary implementation, each active IVLAN creates a new interface with a private address range. Note that the machine can join the same IVLAN multiple times, once on behalf of each logged-in user.

IVLANs support bridging to external networks, and thus, the discovery and communication among active nodes. In one respect, however, this design can be limiting, as each node is sitting on a network that contains devices, PCs, and services that may not be active within the IVLAN. Ideally, each node can advertise a route to its local network. In more robust implementations, resources (e.g., devices) outside the IVLAN and thus, do not reside within the broadcast domain of the IVLAN, can be configured to include application features such as network discovery. This can employ a proxy model that enables authorized devices to obtain an identity within the IVLAN.

One authentication scheme would be that associated with P2P grouping. This scheme essentially creates a private Certificate Authority (CA) and issues membership certificates to all authorized parties. This approach has an advantage that hosts can trust each other by simply verifying that the certificates share a common root. To address certificate revocation, a notion of password-based groups can be employed whereby a node uses a password to access the group and obtains a persistent membership certificate from an administrative node.

Within an overlay network, end-to-end TCP is likely to have low-to-moderate bandwidth, variable latency, and moderate-to-low reliability. TCP congestion control can work effectively in this environment; however, other optimizations are possible.

Of interest are the multiple layers of encapsulation. IP header compression can be introduced in the IVLAN environment to address the multiple layers of encapsulation (e.g., application→TCP→IP→IPSec). Some of the alternative implementations described above seek to remove some of the IP layers entirely, but this optimization could come at the expense of more code (and complexity). Another optimization can be to eliminate the overlay tunnel by simply replacing it with point-to-point IPSec.

If IVLAN point-to-point links can use IPSec, then much of the tunnel overhead can be eliminated (there is no need for TLS and TCP encapsulation). However, for this to occur, IPSec should support user-to-user IPSec, as the IVLAN is using per-user credentials.

Each node will experience traffic that is passed-through and traffic that is destined locally. The system can be configured to determine how much bandwidth to dedicate toward traffic forwarding. Additionally, the system can prioritize which traffic to forward, either based on end-to-end application needs or based on fairness policy, for example.

Within the IVLAN, each node's private IPv6 address resides within a shared subnet, so hierarchical routing schemes such as BGP (border gateway routing) may be inappropriate. As described above, one approach involves each node publishing a list of its neighbors into a database that is replicated over the overlay network. Each node then uses this data to construct its own routing table (based on shortest hop paths). Virtual ring routing (VRR) can be another solution. Alternatively, distributed routing table (DRT) protocols can be run (the protocol underlying PNRP route discovery). In other words, in a more generic way, all protocols normally used for mobile ad-hoc networks can apply, for example, AODV, a proactive protocol (DSDV) and a DHT-based protocol (e.g., VRR).

With respect to neighbor management, the P2P overlay network can seek multiple active connections. Stability of the connections can be considered as well as balancing the potential for route optimization over the cost of route maintenance.

Like any other VPN, a "dialer" client can be provided that allows users to manually connect to the desired IVLANs. A logical extension to this is support for dial-on-demand. Moreover, a configured IVLAN could reside dormant, exposing a private IPv6 address. When that IPv6 address is actually used, the interface becomes active and connects.

In the context of compartmentalization and security, it would be natural to consider IVLANs as machine-wide constructs. Alternatively, an IVLAN can be scoped for use by individual users (network compartments) or even to specific applications (network views).

Machine-wide policies can be defined. A firewall can be used to prevent packet forwarding (thus making a node into an end-station only).

Restrictions can also be put into place in enterprises based on the use of IVLANs for domain-joined machines. Moreover, restrictions can be enforced to ensure that IVLANs cannot be used to bridge traffic to the local physical network.

IVLAN support can provided be available on server SKUs, such that a server can serve as a central node for the home.

Services can be used to manage end-user identity and facilitate IVLAN invitation. Configured IVLANs can be archived in the network cloud, thereby enabling users to download and configure IVLANs from any Internet host. The IVLAN can partially rest on top of a wireless mesh network. The wireless mesh network can rely on homogeneous or heterogeneous wireless technologies. In one implementation, the IVLAN simply re-uses wireless mesh links to reduce duplicate traffic and enhance performance.

A machine can automatically validate the health of a peer machine within the IVLAN before accepting connections or traffic from that host. With hosts potentially forwarding traffic on behalf of other hosts, IVLANs should not be used for propagation of worms, viruses, or malware. In view thereof, a lightweight health validation process can be employed in a peer-to-peer fashion. If unhealthy peers are detected, a service may be invoked to support remediation.

Following is a high-level description of a set of networking experiences that can be offered by the disclosed IVLAN architecture. Over the past few years, networking has been focused on enabling pervasive and collaborative computing. With the prevalence of Wi-Fi hot spots, EV-DO (evolution data optimized), and corporate solutions such as NAP (network access protocol), networking is on the cusp of fulfilling this vision. EV-DO and other "network everywhere" technologies allow users to communicate and collaborate regardless of location. Corporate citizens and customers/partners will be able to collaborate securely and safely regardless of affiliation. New innovations around wireless and the communications stack (e.g., OSI model) enable the computer to communicate and process information at record speeds.

At the same time, the experiences that users desire from a PC have become more mature. Experiences around music, photos, and movies are no longer "delight" features; rather, these experiences are an expected part of the operating system. For example, users now expect to easily import and perfect their photos, to download and listen to music on a PC, MP3 player, media extender, and mobile devices (e.g., PDAs and smartphones). While video/television is a newer experience users will expect to be able to manage television and personal video content.

In other words, the next generation of user experience should include easily managed, ubiquitous access to content and information on any device, anywhere, anytime. Users demand a union of pervasive and collaborative computing and the content. Following is a general description of the types of scenarios that can be offered by the IVLAN architecture.

In the context of a home network example, a user has multiple PCs at home, and would like to be able to share information between home network PCs and devices. This can be done with an add-on application. In order to create the home network, the user downloads the new add-on and installs it. After installation, the add-on presents a setup or join page that allows configuration of the new network. The user is able to choose a name for the home network and a password. As the user who installed the pack, the user can be added as an administrator for the new network. After finishing setting up, the user is taken to a network console that provides instructions on how to add more PCs to the new network. The instructions can include name and password, setting up another PC, (optionally, provisioning a USB key and using the key on another PC), and via a strong password which allows the user to download or transport the add-on.

To join the new network, the user follows the instructions which indicate to go to another PC and join it to the new network. After installing the add-on pack, the PC is joined to the network. The network is already listed, and the user can simply enter the password for the network. The network console is presented which allows for auto-publication of the network to other devices, and easy joining via a password. Using the console, the user sees that the other PC is listed, and is presented with vital security information and the current operating system update status. The user can also be presented with all accounts on both PCs and that the PCs have already been added to a people section. The user can then review the accounts and status on the other PCs. Finally, the user also sees the list of devices attached to the PCs and the network. The devices attached to the PCs have already been added to the network. Network devices are presented for confirmation. The console can be lightweight for home network management, has the ability to manage users, the ability to view/manage PC updates, and the ability to view/manage devices associated with the home network.

The IVLAN architecture facilitates accessing a single desktop from anywhere. The user can see, via the second PC that the account is already setup, and is able to login to the new PC. The new PC desktop can have the same theme as the same elements as the other PC did (e.g., same desktop background, etc.). Documents on the new PC and the first PC can be browsed in a document area that presents one aggregated view of all the documents. Similarly, a photo section can present all the photos accessible by the network. Additionally, a media player application can have already catalogued the music accessible on the network. Printer and printing settings can also be replicated for the new PC. In other words, desktop settings are replicated, user accounts are replicated to other PCs, documents, photos, music, etc., are all made available in normal places, and devices are setup for use.

Network connectivity is also made available over the Internet, and all devices and content in network are made available to a user device over the Internet. For example, from the Internet, the user can access a PC on the home network and print a document to the home printer.

In yet another example, the user can create a website on the home network that can be made accessible to users through the IVLAN. Photos and other types of documents and media can be added for viewing or downloading. Content can be added to the website dragging and dropping audio, photo, and/or media files into the experience. The user can also choose to publish a calendar, for example. The website can be published to selected individuals, directly from a network PC, and announce to the selected contacts.

As a contact recipient, site access is granted and content viewed. The contact can subscribe to and view the user's calendar. The contact can also subscribe to any updates the user makes to the web site and to photo or the media updates. Commenting can also be provided for the contact to comment and/or annotate user content. In other words, the capabilities include at least receiving announcements (e.g., email or toast), accessing the site and viewing the content, subscribing to different "feeds" of content, and commenting on the content.

Once a comment is posted on the private website, a notification can be sent that a new comment has been posted. In response, new content is added and a notification is sent to the contact recipient that the media has been added for viewing. Thus, notifications of newly posted content can be provided locally over the IVLAN, and notifications of newly changed subscription feeds provided locally.

If the user is thereafter taking pictures in a remote location, content can be uploaded to the private website as if the user was on another PC of the home network. Based on being logged into the home network, the publication site recognizes the new content and prompts the user whether the content should be posted. The user confirms and the content is posted. The contact recipient is notified of the new content and the user is able to set up a rule that all pictures from this camera should be published to the site. Thus, capability is provided to upload content from remote locations, add content to the site remotely, home network integration, and upload pictures from the camera automatically to a home network PC from anywhere.

Following is a description of components that can be utilized to enable the experiences associated with the disclosed IVLAN architecture.

A unified concept of identity across the scenarios is part of creating the experiences. Identities provide means to "know" and "be known", and enable end-to-end secure, reliable, connectivity. Identities can be divided into two categories: personal and contacts.

The personal identity is the logical set of information that describes who "I am" to the network and to others. The personal identity contains metadata, such as nickname or home address, and credentials used to prove who identity to other people and contacts.

Contacts are the personal identities of other people a person "knows' or "trusts". Contacts are used to authenticate, authorize, and manage metadata about another individual. It is desirable for individuals in a personal contact list to be explicitly trusted locally or verified via a trusted third party.

The association of individuals or PCs together utilizes a group semantic. This group is able to communicate and authenticate each other into the group. Once in the group, communications happens securely without being prone to an attacking outsider. Each member of the group trusts the other members, and data can be passed between the group members based on a member permissions associated with an access control list (ACL), if desired.

Seamless communication between nodes in the local or distributed network is desirable for enabling the experiences. End-to-end secure, reliable, connectivity should be provided to enable the experiences.

Since IP addresses are dynamic, a mechanism can be employed to identify endpoints without fear of those identifiers changing. These identifiers map to an identity (or which can be the identity), so resolution from an identity to an endpoint can occur. This technology could be a rendezvous server that authenticates identities and returns the endpoint associated with a registered identity. Since it can be anticipated that billions of users could be utilizing the IVLAN architecture, a peer-to-peer solution that provides fixed identifiers secured by an identity and resolvable without a server can be alternative solution. PNRP is a solution that fulfills most of these requirements.

Since communication will be happening between peer devices directly over the Internet, edge security is needed to protect users. Users must know that they are indeed communicating with the correct contact, that the communication is secured, and that the person they are communicating with is only receiving information they are authorized to receive. One solution to this firewall concern is IPSec.

Network device discovery provides users the ability to discover and associate with devices on the network. Once associated with a machine, the device can be used as if it was attached to the PC directly. Once the device is associated with the PC, users can then manage the devices associated with the system, or take advantage of installed features (e.g., printer options) to utilize the device more effectively.

A next generation of device is one that can be communicated with over the Internet and that communicates across the Internet (e.g., and Internet camera). In other words, users could take a picture in Hawaii, and have it automatically sent back to a PC at home using the disclosed IVLAN architecture. A WS-Devices protocol and other technology suites can enable this scenario.

In the scenarios above, content and state were replicated between the machines. It was really the state of the user's desktop, the state of the machine (e.g., what devices were present/associated), and the state of the content (e.g., ACL'ing, etc.). The replication of this state allowed users to access a desktop from anywhere.

In the aforementioned example, the first thing the user did was to associate the PCs together. This can be facilitated using Web Services for Devices technology to associate the PCs, thereby forming a group association. Once the association occurs, the content/state replication can begin synchronizing state across to the new associated PC for each personal identity. Finally, the home network group can be published in a Global PNRP cloud as an endpoint that can be resolved to any node in the home network. Once resolved, a connection can be established over IPv6 utilizing the NAT and firewall traversal solutions to ensure connectivity. Once the connection is established, the content/state synchronization utilization can occur. This can also include a mechanism that invokes a device action remotely. This can be in the form of a proxy execution from the group association, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 19:
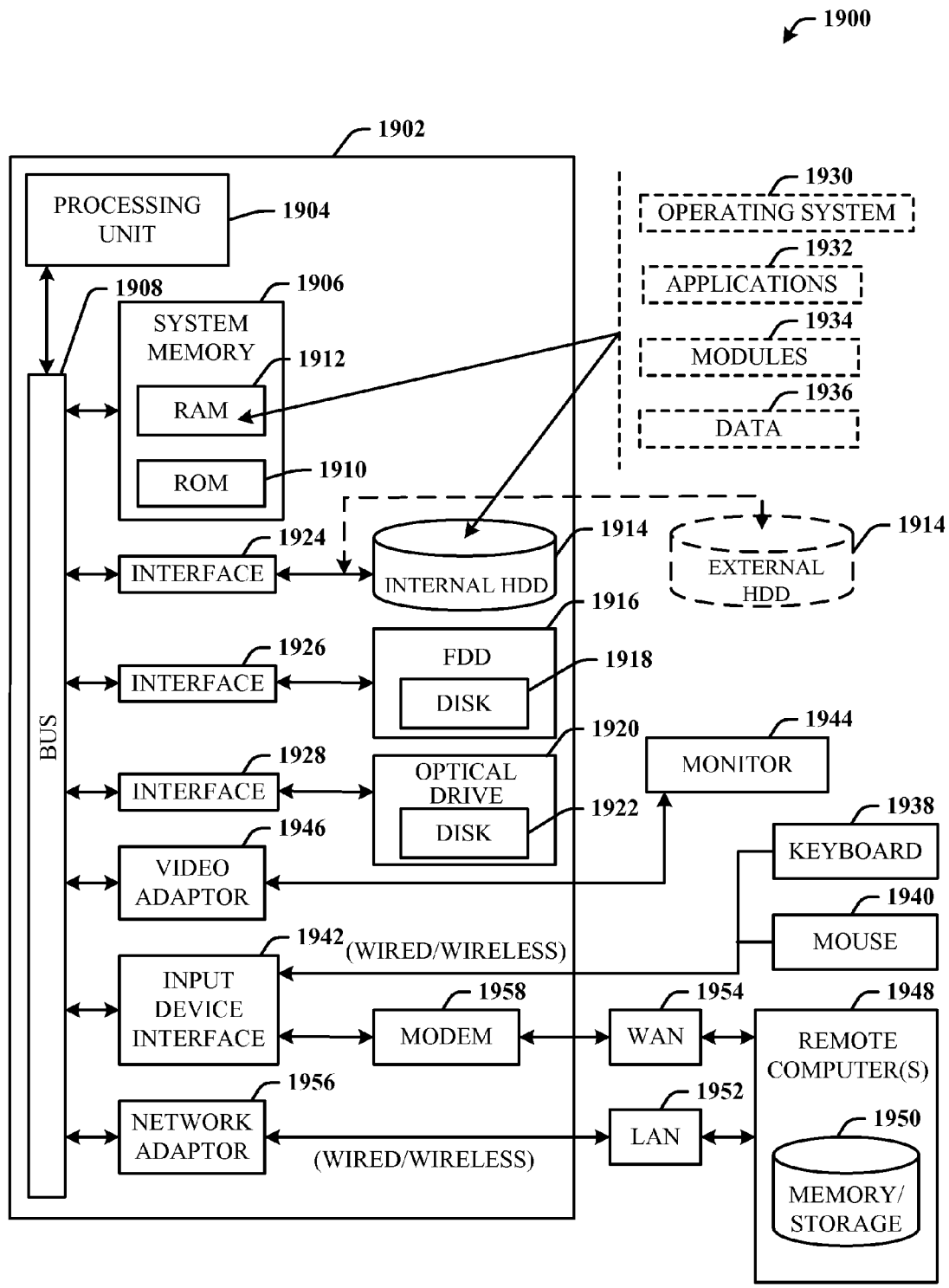
FIG. 19 illustrates a block diagram of a computing system operable to execute the disclosed IVLAN architecture.

Referring now to FIG. 19, there is illustrated a block diagram of a computing system 1900 operable to execute the disclosed IVLAN architecture. In order to provide additional context for various aspects thereof, FIG. 19 and the following discussion are intended to provide a brief, general description of a suitable computing system 1900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 19, the exemplary computing system 1900 for implementing various aspects includes a computer 1902, the computer 1902 including a processing unit 1904, a system memory 1906 and a system bus 1908. The system bus 1908 provides an interface for system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1912, including an operating system 1930, one or more application programs 1932, other program modules 1934 and program data 1936. The one or more application programs 1932, other program modules 1934 and program data 1936 can include the management component 102, client 104, interface component 114, the virtual IP layer 202, P2P layer 204, real IP layer 206, the user application 304, VNIC 302 and subcomponents (306, 308, 310), the TCP/IP layer 312, the legacy applications (APP1, APP2), the local DNS resolver 702 and NL 704, overlay manager 802, credential store 804, setup and monitoring component 806, PNRP 808, and the components of systems 900, 100, 1100, 1200 and 1300, for example.

All or portions of the operating system, applications, modules, and/or data can also be cached in the RAM 1912. It is to be appreciated that the disclosed architecture can be implemented with various commercially available operating systems or combinations of operating systems.

A user can enter commands and information into the computer 1902 through one or more wire/wireless input devices, for example, a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wire and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wire/wireless connectivity to a local area network (LAN) 1952 and/or larger networks, for example, a wide area network (WAN) 1954 and/or the IVLAN described herein. Such LAN and WAN networking environments are commonplace in offices and companies, and facilitate enterprise-wide computer networks, such as intranets, all of which may connect to a global communications network, for example, the Internet.

When used in a LAN networking environment, the computer 1902 is connected to the local network 1952 through a wire and/or wireless communication network interface or adapter 1956. The adaptor 1956 may facilitate wire or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wire and/or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (e.g., a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented networking system, comprising:
   a computing device having a processor for executing computer-executable components stored in memory, the computer-executable components including:
      a management component for creating and managing a peer-to-peer (P2P) graph that overlays a private local area network which includes the computing device and a mobile device, the management component publishing name records of the computing device and the mobile device in the P2P graph to enable discovery of the computing device and the mobile device for P2P communications between nodes of the P2P graph, the management component including a local name resolver for resolving name records in the P2P graph, the local name resolver maintaining a list of peer identifiers, IP addresses, and name records published by the nodes of the P2P graph; and
      an interface component for exposing the P2P graph to a public node of a public network as a virtual network interface card configured by the management component to:
   receive packets from the public node of the public network, forward packets comprising name resolution requests to the management component for server-less name resolution of the name resolution requests by the local name resolver, and forward packets intended for a destination node of the P2P graph to the management component for routing the packets intended for the destination node of the P2P graph as P2P messages through the nodes of the P2P graph using the peer identifiers for enabling communication between the public node of the public network and the destination node of the P2P graph when an IP address of the mobile device changes.

2. The system of claim 1, wherein the management component assigns IPv4 and IPv6 addresses to the virtual network interface card.

3. The system of claim 1, wherein the management component is created on a physical network interface card address.

4. The system of claim 3, wherein the physical network interface card address is an IPv4 address or an IPv6 address.

5. The system of claim 1, wherein:
   the virtual network interface card (VNIC) is controlled by a VNIC driver, and
   the VNIC driver exposes a miniport driver interface and a file stream interface for passing Internet Protocol (IP) packets to the management component.

6. The system of claim 5, wherein the management component includes a user-level application for controlling and configuring the virtual network interface card (VNIC) and for communicating IP packets on behalf of the VNIC.

7. The system of claim 1, wherein the management component facilitates at least one of multicast traffic or broadcast traffic.

8. The system of claim 1, wherein the management component facilitates traversal of at least one of a firewall system or a network address translation system.

9. The system of claim 1, wherein the virtual network interface card (VNIC) comprises a VNIC driver that intercepts Ethernet packets and exposes a file stream interface for passing Internet Protocol (IP) packets to the management component for routing and transmission of the IP packets to the nodes of the P2P graph.

10. The system of claim 1, wherein the management component includes a routing protocol for enabling multi-hop message routing over the P2P graph.

11. The system of claim 1, wherein the local name resolver uses at least one of a peer name resolution protocol and a link local multicast name resolution protocol.

12. A computer-implemented method of networking devices, comprising:
   creating, by a user application on client computing device, a peer-to-peer (P2P) graph that overlays a private local area network which includes the client computing device and a mobile device, the client computing device comprising a physical network interface card and a virtual network interface card (VNIC);

publishing, by the user application, name records of the client computing device and the mobile device in the P2P graph to enable discovery of the client computing device and the mobile device for P2P communications between nodes of the P2P graph, the user application comprising a local name resolver for resolving name records in the P2P graph;

maintaining, by the local name resolver, a list of peer identifiers, IP addresses, and name records published by the nodes of the P2P graph;

exposing, by the VNIC, the P2P graph to a public node of a public network;

receiving, by the VNIC, Internet Protocol (IP) traffic from the public node of the public network;

forwarding, by the VNIC, IP packets comprising name resolution requests to the management component for server-less name resolution of the name resolution requests by the local name resolver;

forwarding, by the VNIC, IP packets intended for a destination node of the P2P graph to the user application; and routing, by the user application, the IP packets intended for the destination node of the P2P graph as P2P messages through the nodes of the P2P graph for enabling communication between the public node of the public network and the destination node of the P2P graph when an IP address of the mobile device changes.

13. The method of claim 12, further comprising:
assigning, by the user application, a private IP address range to each of the nodes of the P2P graph.

14. The method of claim 12, further comprising:
enabling, by the user application, multi-hop message routing over the P2P graph.

15. The method of claim 12, further comprising:
flooding, by the user application, the name records to all nodes of the P2P graph.

16. The method of claim 12, further comprising:
exposing, by the VNIC, IPv4 and IPv6 interfaces for accommodating corresponding applications.

17. The method of claim 12, wherein the local name resolver uses at least one of a peer name resolution protocol and a link local multicast name resolution protocol.

18. The method of claim 12, further comprising:
providing, by the user application, point-to-point TCP connections for direct communications between participating nodes of the P2P graph.

19. The method of claim 12, further comprising:
replicating, by the user application, a database among the nodes of the P2P graph.

20. A computer-readable storage device storing computer-executable instructions that, when executed, cause a computing device to performs steps comprising:
creating, via a user application, a peer-to-peer (P2P) graph that overlays a private local area network which includes the computing device and a mobile device;

publishing, by the user application, name records of the computing device and the mobile device in the P2P graph to enable discovery of the computing device and the mobile device for P2P communications between nodes of the P2P graph, the user application comprising a local name resolver for resolving name records in the P2P graph;

maintaining, by the local name resolver, a list of peer identifiers, IP addresses, and name records published by the nodes of the P2P graph;

configuring, via the user application, a virtual network interface card to:
expose the P2P graph to a public node of a public network,
receive packets from the public node of the public network,
forward packets comprising name resolution requests to the management component for server-less name resolution of the name resolution requests by the local name resolver, and
forward packets intended for a destination node of the P2P graph to the user application for routing the packets intended for the destination node of the P2P graph as P2P messages through the nodes of the P2P graph using the peer identifiers for enabling communication between the public node of the public network and the destination node of the P2P graph when an IP address of the mobile device changes.

\* \* \* \* \*